Aug. 4, 1953 G. H. RIDINGS ET AL 2,647,945
FACSIMILE MACHINE AND SYSTEM EMPLOYING ELECTRIC
STYLUS TRANSMISSION AND RECORDING
Filed Nov. 16, 1948 16 Sheets-Sheet 1

INVENTORS
G. H. RIDINGS
J. H. HACKENBERG
BY G. B. WORTHEN

ATTORNEY

Aug. 4, 1953   G. H. RIDINGS ET AL   2,647,945
FACSIMILE MACHINE AND SYSTEM EMPLOYING ELECTRIC
STYLUS TRANSMISSION AND RECORDING
Filed Nov. 16, 1948   16 Sheets-Sheet 4

INVENTORS
G. H. RIDINGS
J. H. HACKENBERG
BY  G. B. WORTHEN

*A. A. Thomas*
ATTORNEY

Aug. 4, 1953 G. H. RIDINGS ET AL 2,647,945
FACSIMILE MACHINE AND SYSTEM EMPLOYING ELECTRIC
STYLUS TRANSMISSION AND RECORDING
Filed Nov. 16, 1948 16 Sheets-Sheet 6

INVENTORS
G. H. RIDINGS
J. H. HACKENBERG
G. B. WORTHEN
BY
ATTORNEY

Aug. 4, 1953 G. H. RIDINGS ET AL 2,647,945
FACSIMILE MACHINE AND SYSTEM EMPLOYING ELECTRIC
STYLUS TRANSMISSION AND RECORDING
Filed Nov. 16, 1948 16 Sheets-Sheet 7
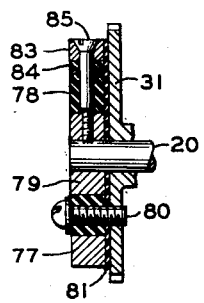
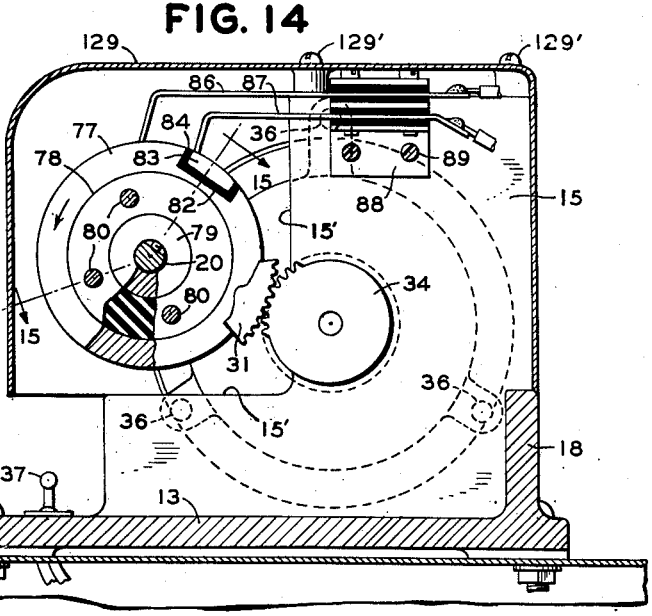
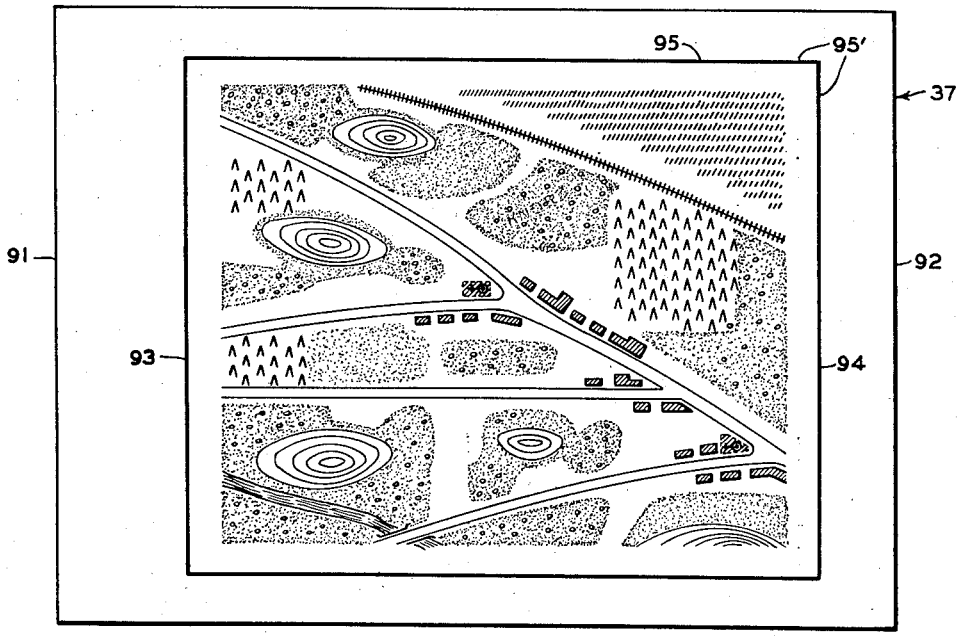
INVENTORS
G. H. RIDINGS
J. H. HACKENBERG
BY  G. B. WORTHEN
*A. A. Thomas*
ATTORNEY

*INVENTORS*
G. H. RIDINGS
J. H. HACKENBERG
G. B. WORTHEN

BY

ATTORNEY

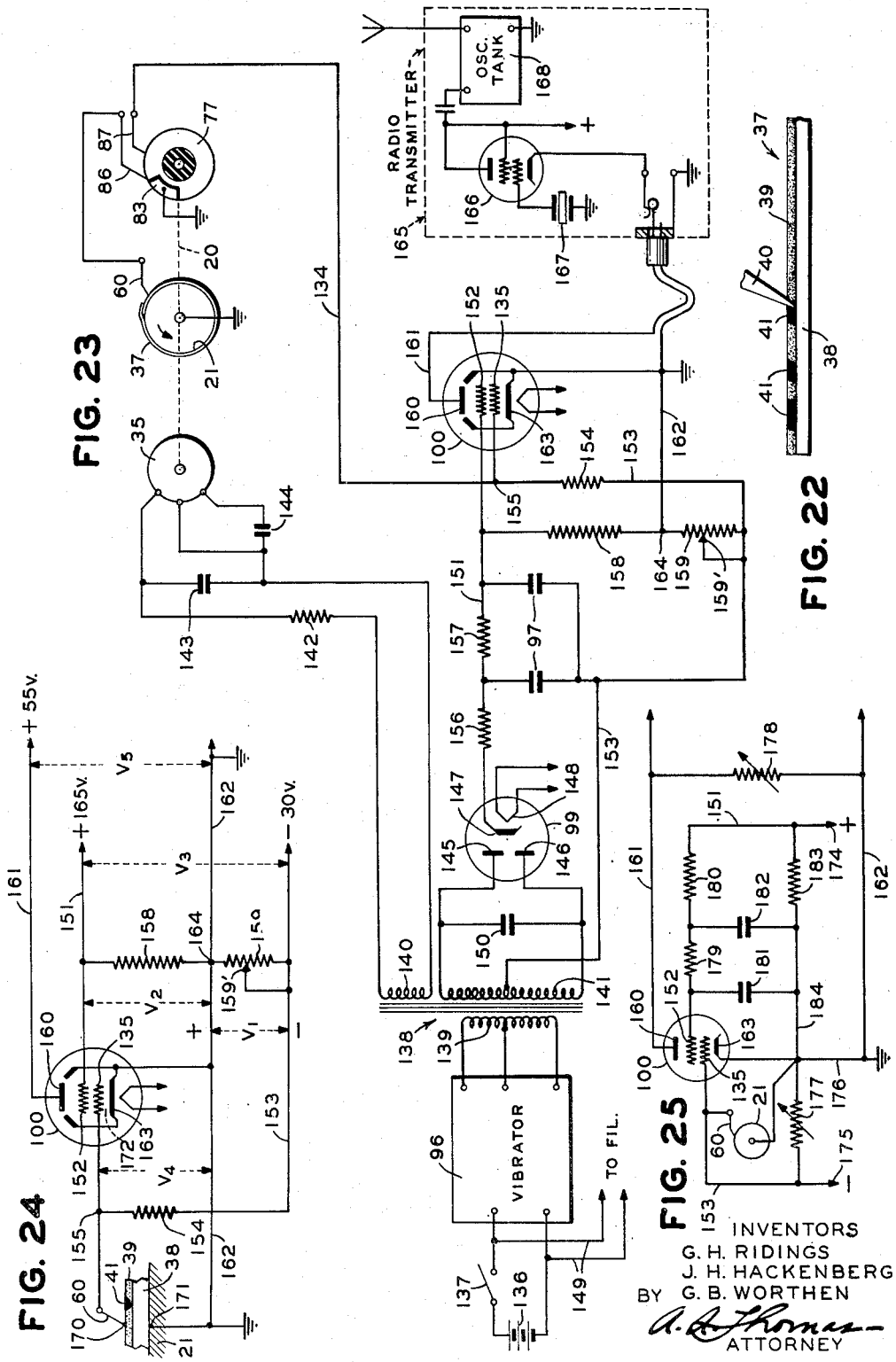

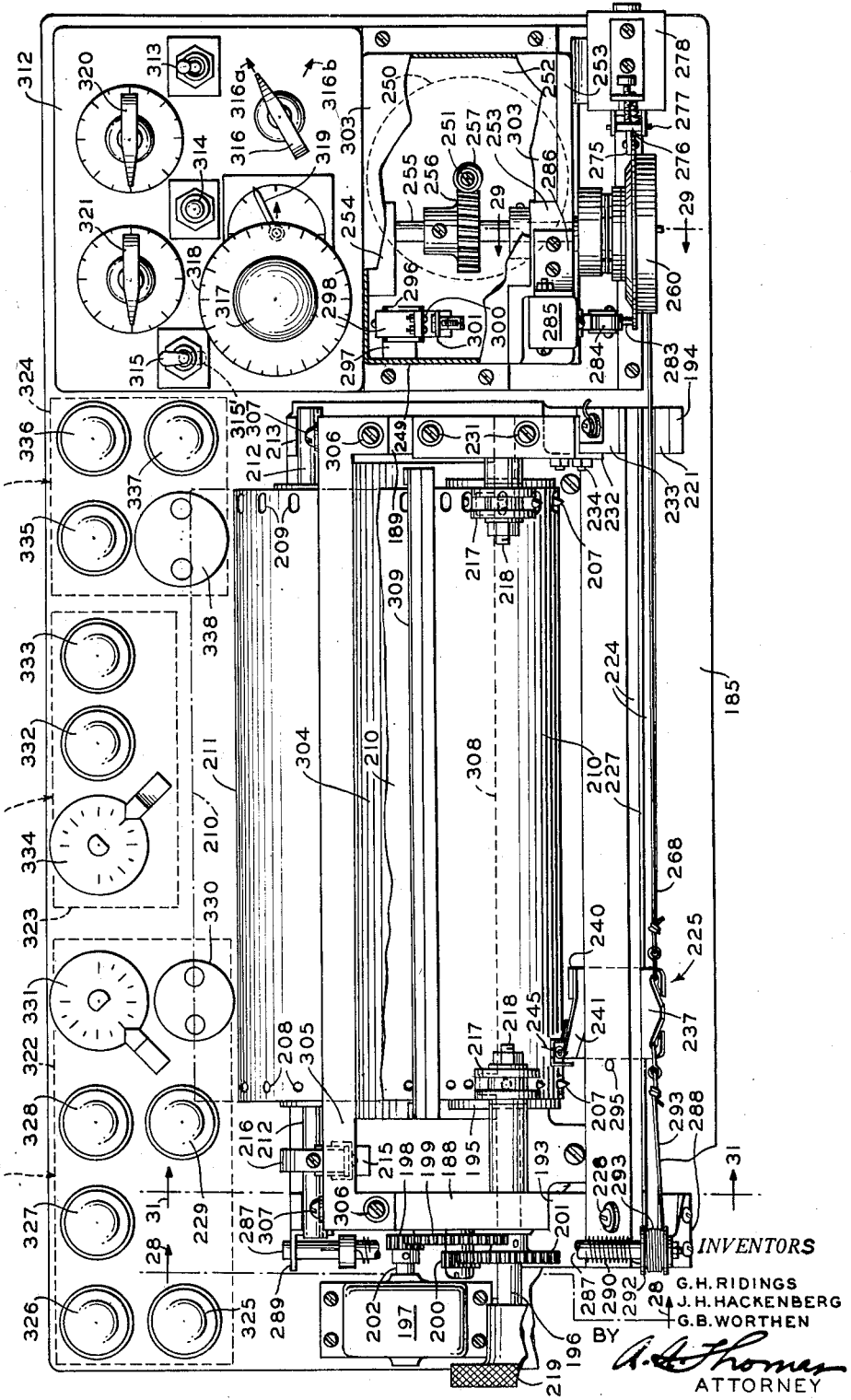

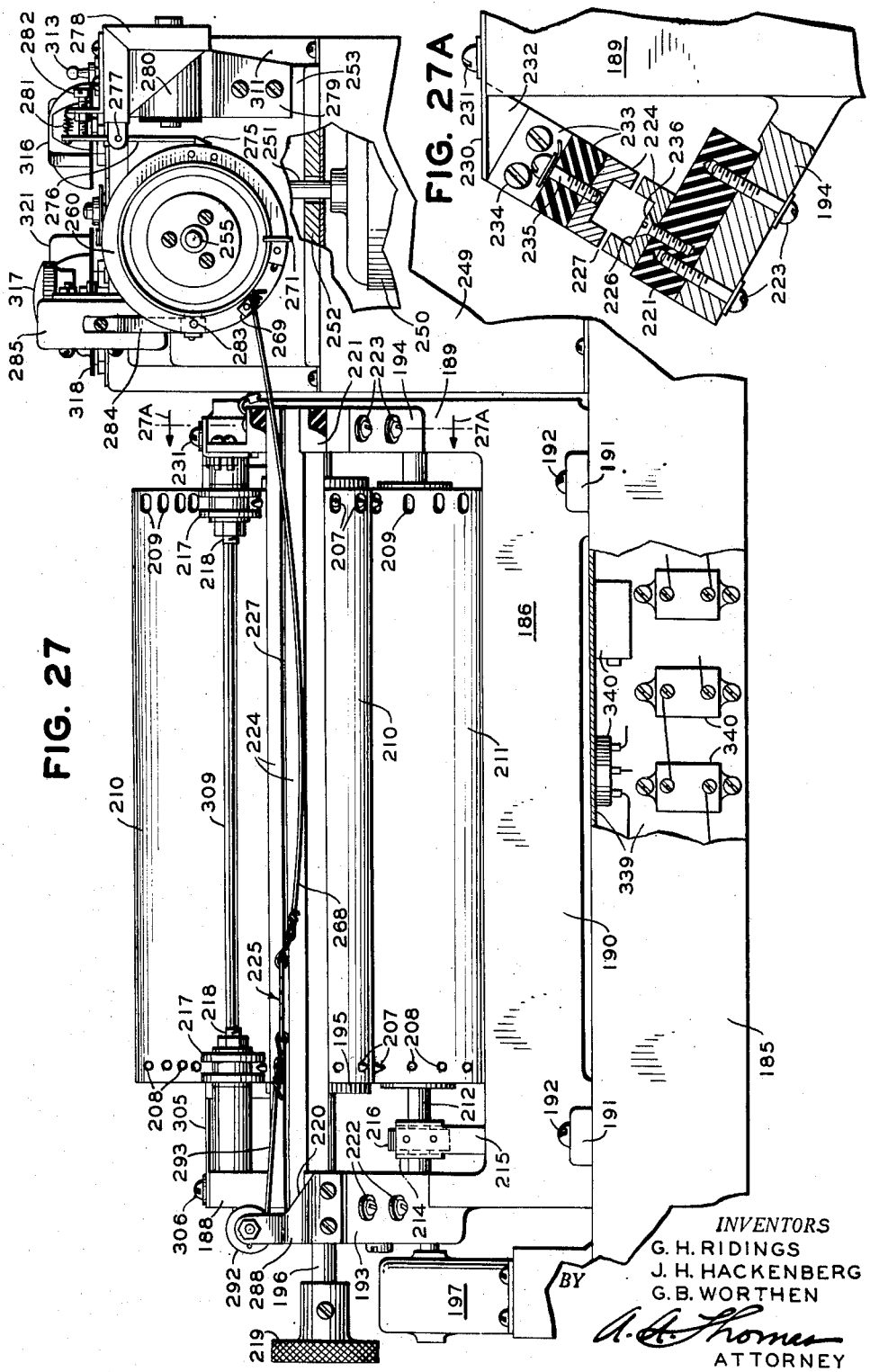

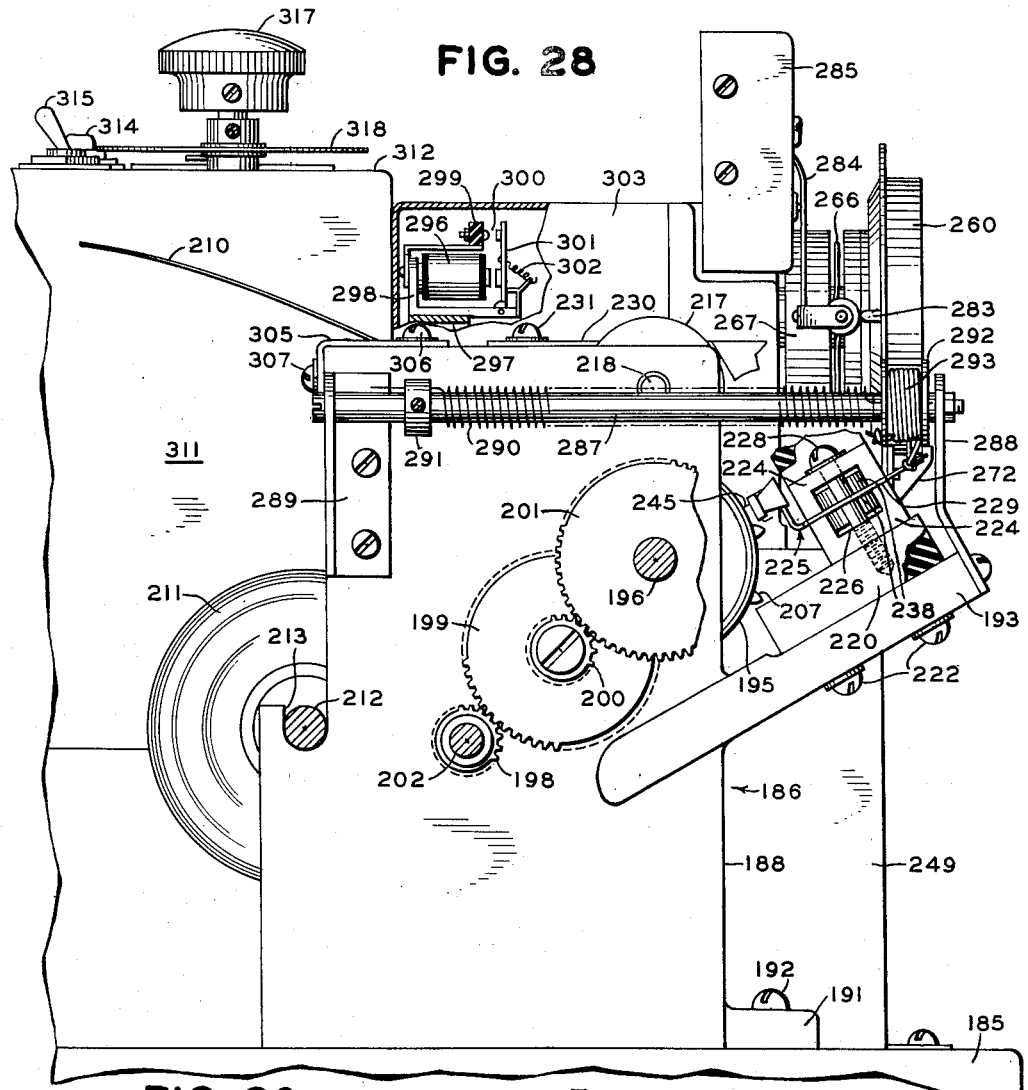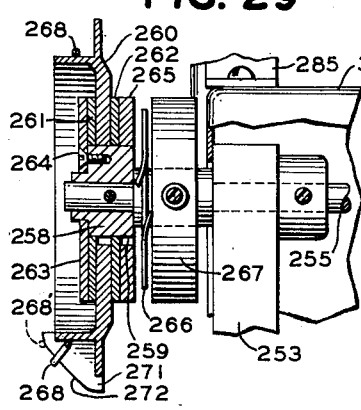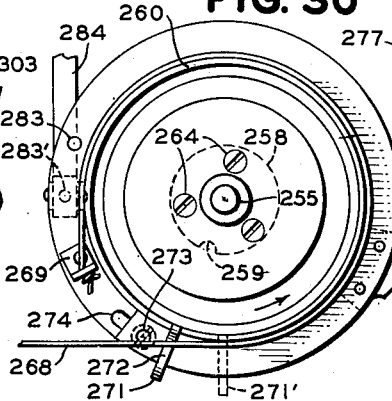

Aug. 4, 1953    G. H. RIDINGS ET AL    2,647,945
FACSIMILE MACHINE AND SYSTEM EMPLOYING ELECTRIC
STYLUS TRANSMISSION AND RECORDING
Filed Nov. 16, 1948    16 Sheets-Sheet 13
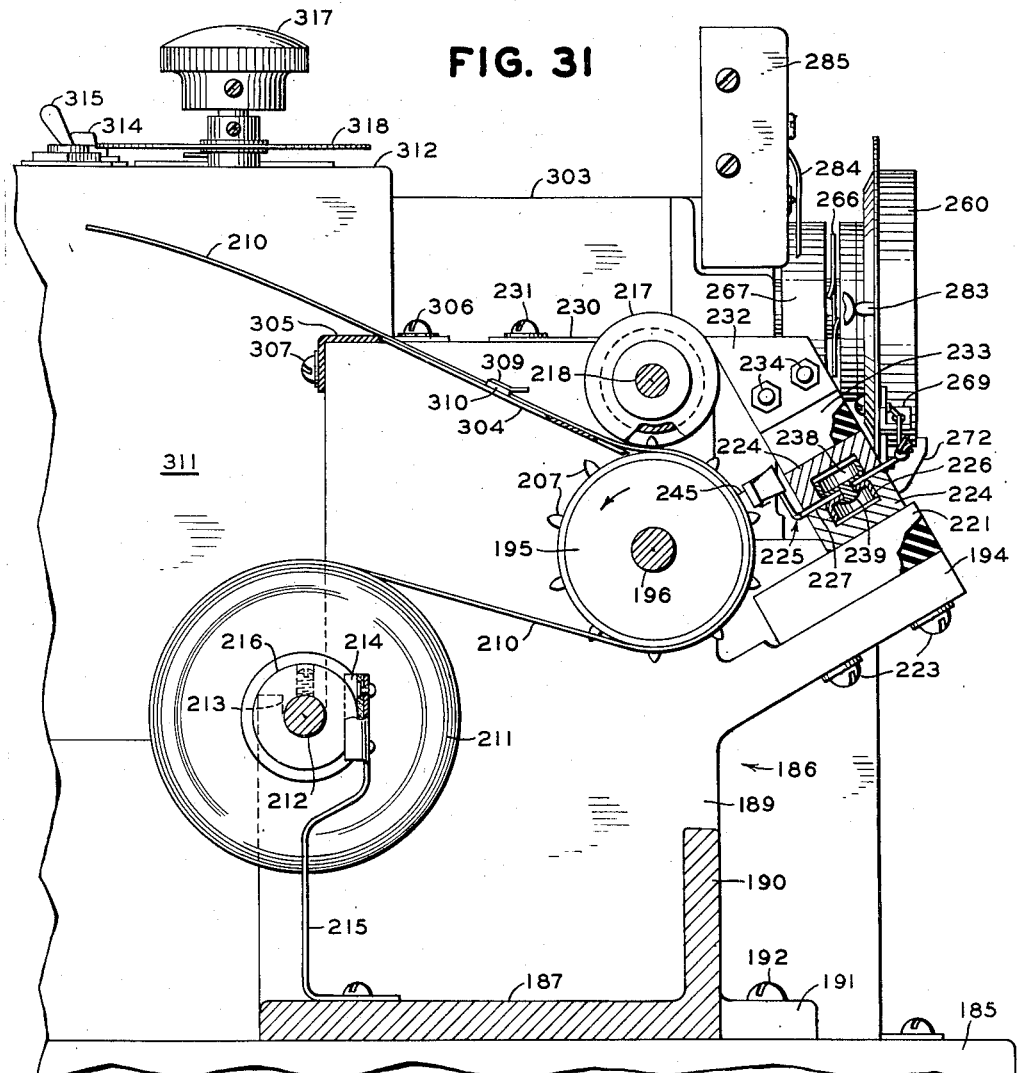
FIG. 31
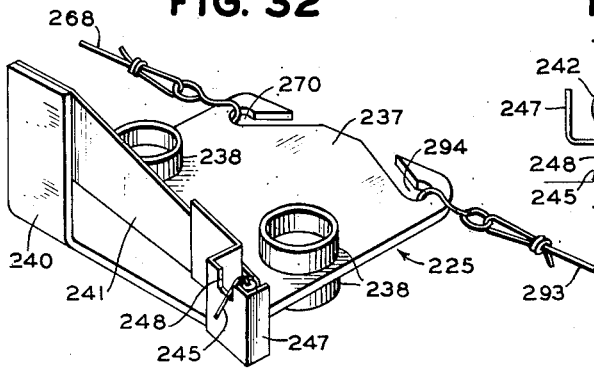
FIG. 32    FIG. 33    FIG. 34
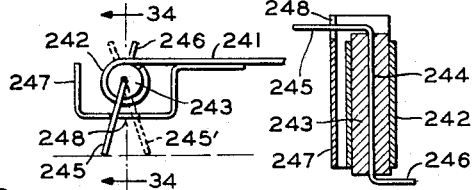
INVENTORS
G. H. RIDINGS
J. H. HACKENBERG
G. B. WORTHEN
BY
ATTORNEY Aug. 4, 1953  G. H. RIDINGS ET AL  2,647,945
FACSIMILE MACHINE AND SYSTEM EMPLOYING ELECTRIC
STYLUS TRANSMISSION AND RECORDING
Filed Nov. 16, 1948  16 Sheets-Sheet 16
FIG. 37
OUTPUT OF DIFFERENTIATING
CIRCUIT 328c-328d
TUBE 328
LEFT SIDE    RIGHT SIDE
A4 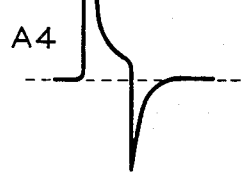   A5 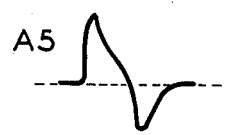   A6 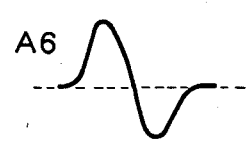
B4 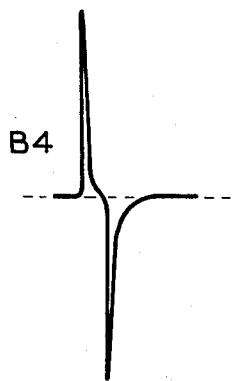   B5 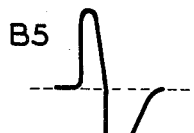   B6 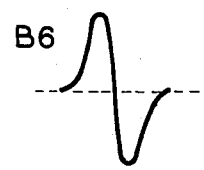
C4 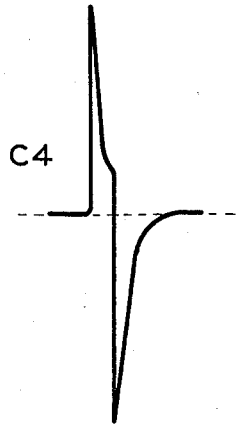   C5 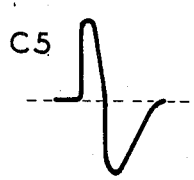   C6 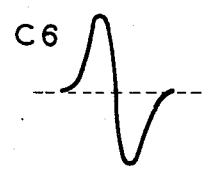
INVENTORS
G. H. RIDINGS
J. H. HACKENBERG
G. H. WORTHEN
BY
ATTORNEY Patented Aug. 4, 1953

2,647,945

UNITED STATES PATENT OFFICE 2,647,945

FACSIMILE MACHINE AND SYSTEM EMPLOYING ELECTRIC STYLUS TRANSMISSION AND RECORDING

Garvice H. Ridings, Summit, N. J., John H. Hackenberg, Flushing, and George B. Worthen, New York, N. Y., assignors to The Western Union Telegraph Company, New York, N. Y., a corporation of New York Application November 16, 1948, Serial No. 60,334

14 Claims. (Cl. 178—6.6)

Our invention relates to the art of transmitting intelligence by facsimile signals and its principal object is to provide a system using a portable transmitter adapted to communicate with a distant receiver through a radio channel. Our facsimile system is primarily designed to operate under severe conditions such as would prevail, for example, in a field of hostilities where a soldier in an advanced position has to send vital information to headquarters quickly and accurately.

The portable sending equipment of our system comprises essentially a facsimile transmitter and a radio transmitter, each enclosed in a case with a self-contained power unit which operates from a small storage battery. The entire equipment can be easily carried about, the radio transmitter on the back and the facsimile transmitter by a handle like a small traveling case. The facsimile transmitter is a small compact piece of apparatus wholly self-contained and designed to be produced at low cost, being made as simple and light as possible.

Our facsimile transmitter has been devised to operate with a conducting paper on which the subject matter to be transmitted (such as a map, sketch, diagram, and the like) is marked with a pencil of soft graphite. After the information has been written on a sheet of this paper, the operator mounts the sheet on a rotary drum where it is scanned by an electric stylus. The pencil markings are conducting (that is, of low resistance) as compared with the high impedance of the unmarked paper and cause the stylus to produce voltage variations in the grid circuit of a vacuum tube. These voltage variations represent the scanned copy and are fed into the cathode circuit of the radio transmitter which sends the signals to the distant receiver.

Our facsimile transmitter includes a novel arrangement for producing a phasing pulse to start the recording operation of a receiver in phase with the scanning operation of the transmitter. This phasing arrangement comprises a commutator adapted to generate a phasing pulse in the grid circuit of the keying or modulator tube of the facsimile transmitter at each revolution of the scanning drum. The phasing pulse is sent out during the brief interval in which the transmitting stylus crosses the unmarked area at the overlapping ends of the sheet on the drum.

The receiving equipment embodied in our system to record the signals coming from the facsimile transmitter over a continuous-wave radio channel was designed to operate over a wide range of input signal level. For this purpose we have provided a recording amplifier of novel construction and operation. This amplifier comprises a series of vacuum tubes of such characteristics and interstage coupling that the amplifier automatically shapes the pulses of weak and strong signals into a substantially uniform A. C. wave which passes into the recording circuit at the proper level. This means that signals varying in strength over a wide range are recorded with practically the same density. The novel circuits and control devices by which we accomplish this result will be fully explained in due course.

Our system operates either with start-stop phasing or with synchronous phasing, and either one of these phasing operations can be brought into use by the receiver attendant to effect the best recording results. In our present embodiment, we use a recorder in which a continuous sheet of recording paper is traversed by a scanning stylus in a reciprocating movement. While this type of recorder is broadly old (see Wise and Parrott Patent No. 2,311,803, February 23, 1943), our machine involves certain new features which are adapted for operation either on start-stop or on synchronous phasing.

The synchronizing of the reciprocating stylus in the recorder is accomplished by a synchronous motor which can be selectively controlled by the attendant either to operate continuously in synchronism with the scanning drum at the transmitter or to operate at a speed slightly greater than that of the transmitter with phasing corrections once for each revolution of the transmitting drum. When atmospheric conditions make the start-stop phasing operation unreliable, the attendant merely throw a switch to let the stylus motor run continuously and adjusts an oscillator to cut the motor speed down to transmitting synchronism.

This double phasing or synchronizing operation of the recorder assures correct copy even under unfavorable atmospheric conditions. Further, the oscillator adjustment done by means of a variable condenser enables the attendant at the receiver to get the stylus motor into synchronism with any one of a number of transmitters where the scanning speed is liable to vary in the different machines. This fine adjustment of the stylus motor speed in the recorder is important when it is considered that the portable transmitters of this system are necessarily low-cost outfits built to run on a 6-volt battery and it is not to be expected that the scanning speeds in all machines would be exactly the same.

In this introductory part of the specification, we have not attempted to point out all the novel features and practical advantages of our invention, for those will be fully explained in connection with the accompanying drawings which illustrate an embodiment of our invention as actually built and operated. In these drawings:

Figs. 1 and 2 together represent a top view of the transmitter used in our system, these two figures joining along the line A—A;

Figure 1:
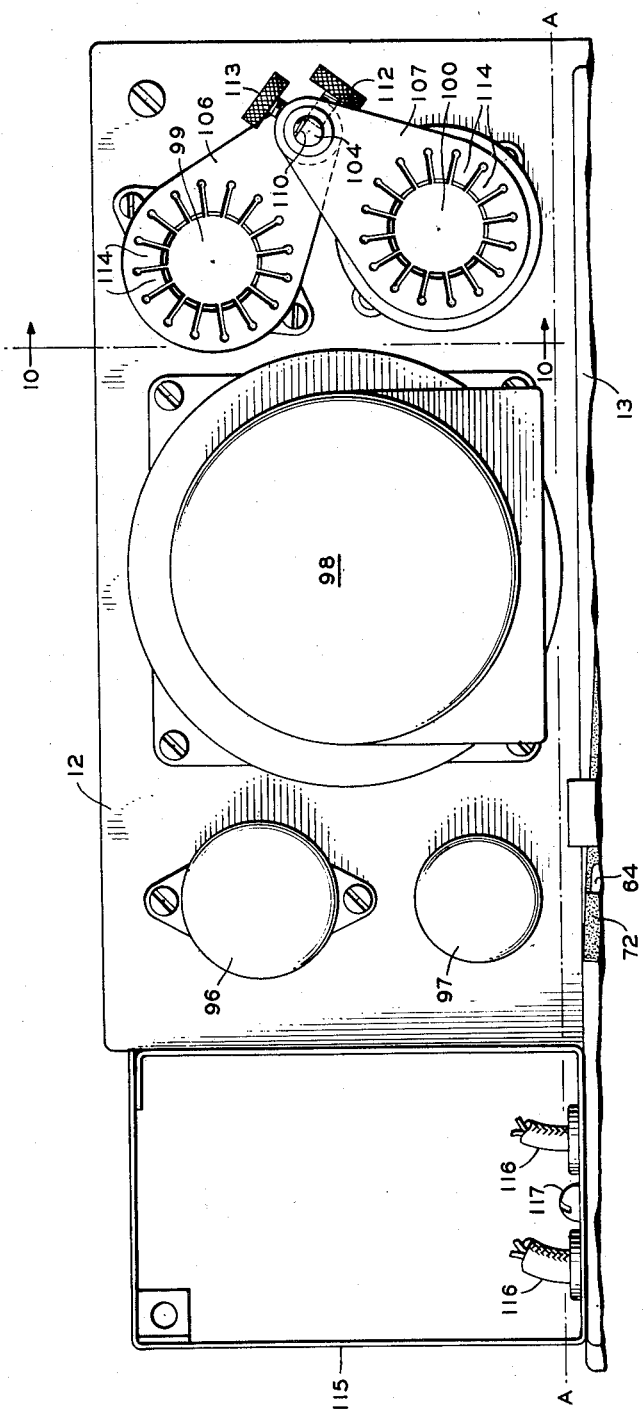
Figure 2:
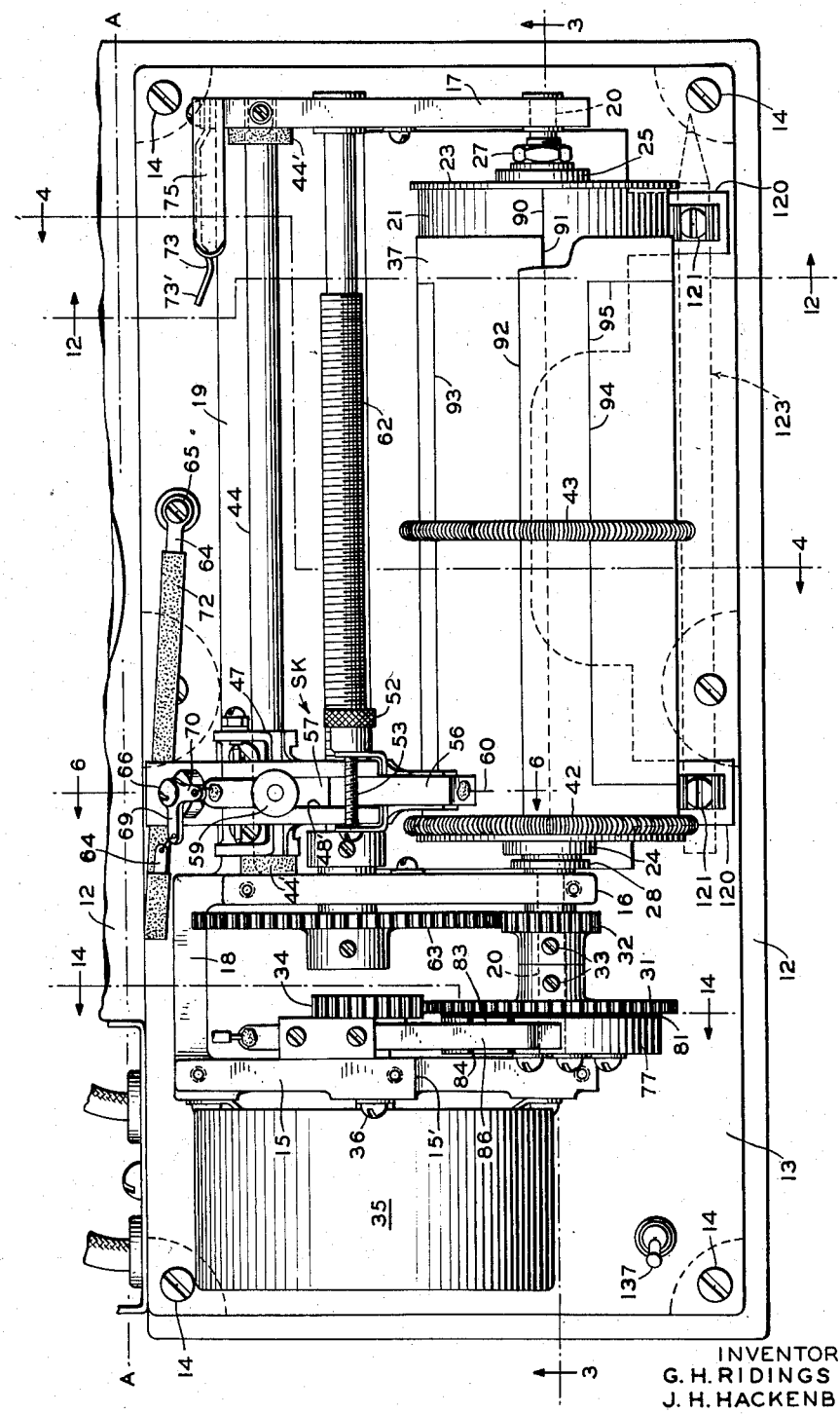
Figure 6:
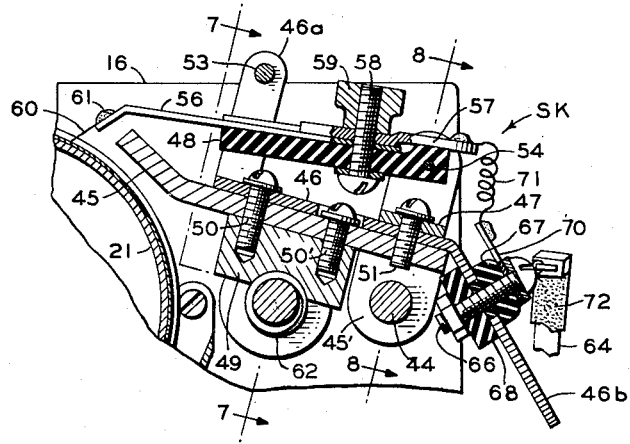
Fig. 6 shows an enlarged section through the stylus carriage on line 6—6 of Fig. 2.
Figure 7:
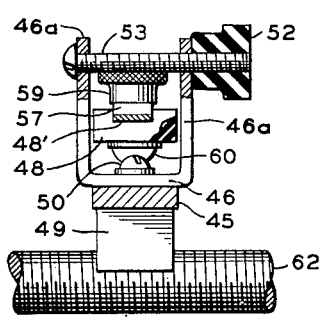
Figure 8:
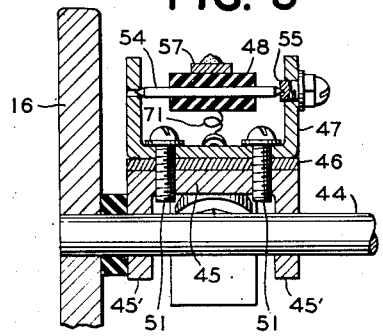
Figure 9:
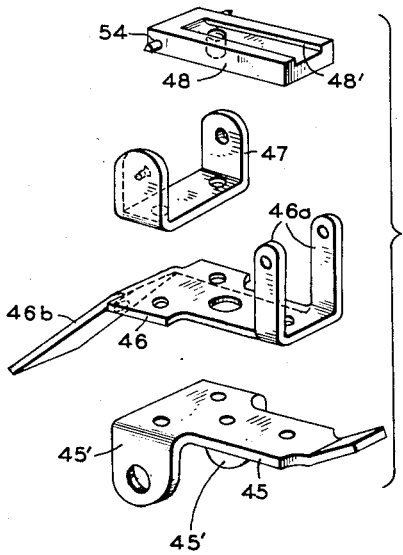
Figure 10:
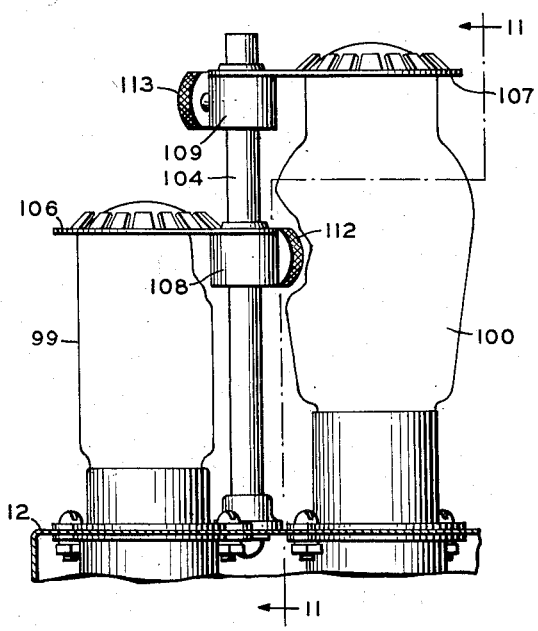
Figure 11:
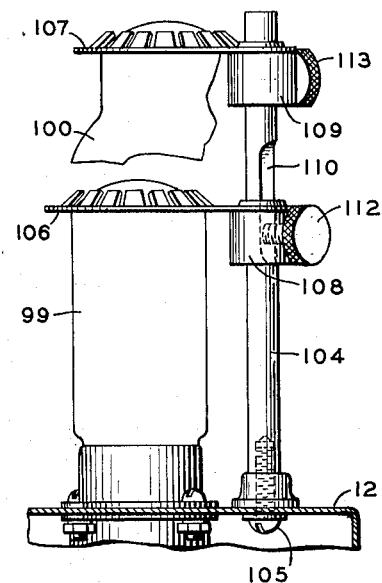
Figure 12:
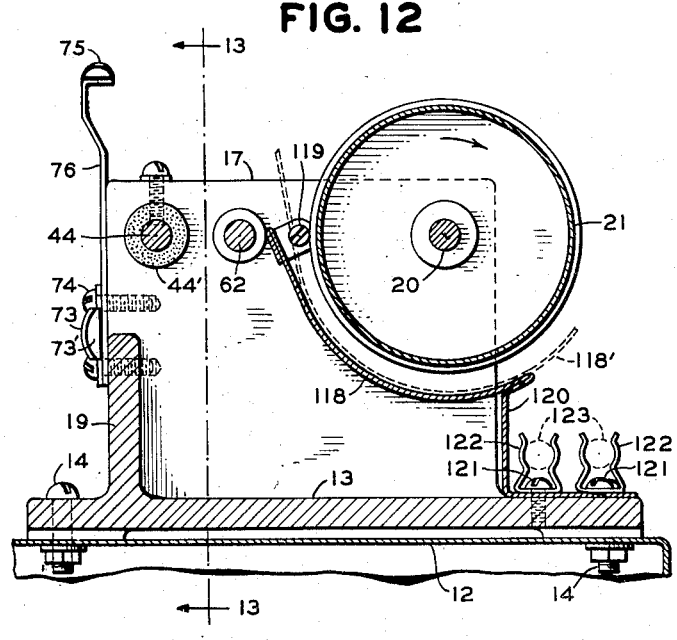
Figure 13:
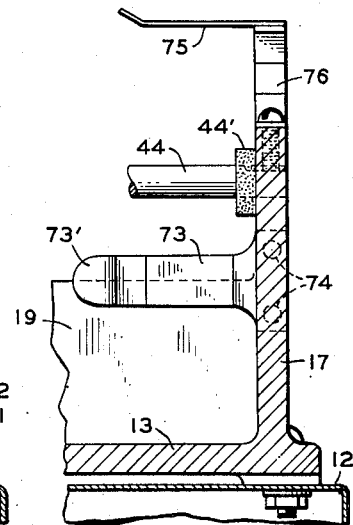
Figure 21:
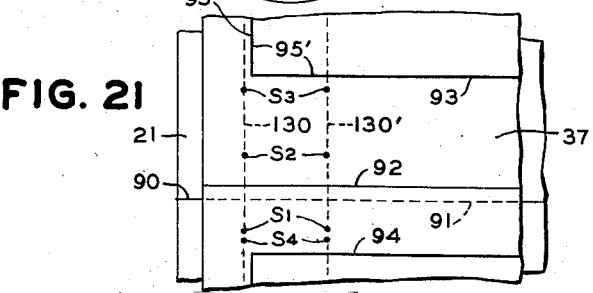
Figure 35:
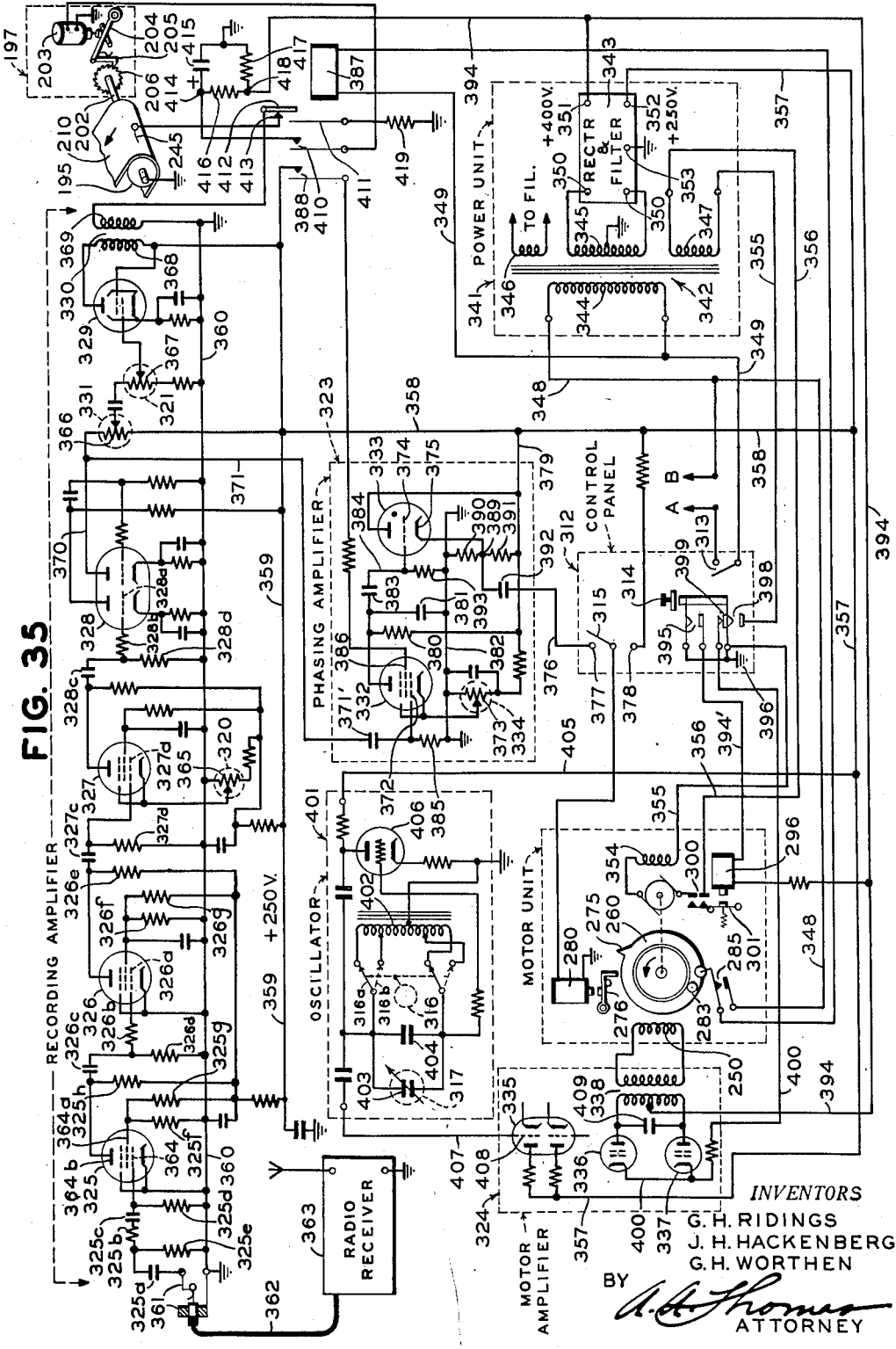

Figs. 7 and 8 are sectional views on lines 7—7 and 8—8, respectively, of Fig. 6;

Fig. 9 is an exploded view of the stylus mounting;

Fig. 10 is a section on line 10—10 of Fig. 1 showing the mounting of certain vacuum tubes used in the transmitter circuits;

Fig. 11 is a section on line 11—11 of Fig. 10;

Fig. 12 shows a transverse section on the line 12—12 of Fig. 2;

Fig. 13 is a section on line 13—13 of Fig. 12;

Fig. 14 is a transverse section on line 14—14 of Fig. 2;

Fig. 15 is a section on line 15—15 of Fig. 14;

Fig. 16 illustrates an example of a sketch to be transmitted from an advanced position in a field of action to headquarters;

Figs. 17 to 20 are diagrammatic views of four successive positions of the phasing commutator and scanning drum of the transmitter during a phasing interval;

Fig. 21 is a developed plan of the successive stylus positions shown in Figs. 17 to 20;

Fig. 22 shows in an exaggerated way how conducting marks are made by a soft graphite pencil on the insulating top surface of a transmitting blank;

Fig. 23 is a diagram of the transmitter circuits;

Fig. 24 is a simplified detail of the transmitter circuits;

Fig. 25 is a modification of Fig. 24;

Fig. 26 shows a top view of the portable facsimile receiver used in our system;

Fig. 27 is a front view of the receiver;

Fig. 27A represents an enlarged section on line 27A of Fig. 27;

Fig. 28 is an enlarged left end view of Fig. 26 on line 28—28;

Fig. 29 is an enlarged section on line 29—29 of Fig. 26;

Fig. 30 is a front view of Fig. 29 looking from left to right;

Fig. 31 represents a transverse section on line 31—31 of Fig. 26;

Fig. 32 shows an enlarged detail of the stylus carriage used in the receiver;

Fig. 33 is an enlarged detail of the stylus mounting;

Fig. 34 is a cross-section on line 34—34 of Fig. 33;

Fig. 35 is a diagram of the receiver circuits; and

Figure 36:
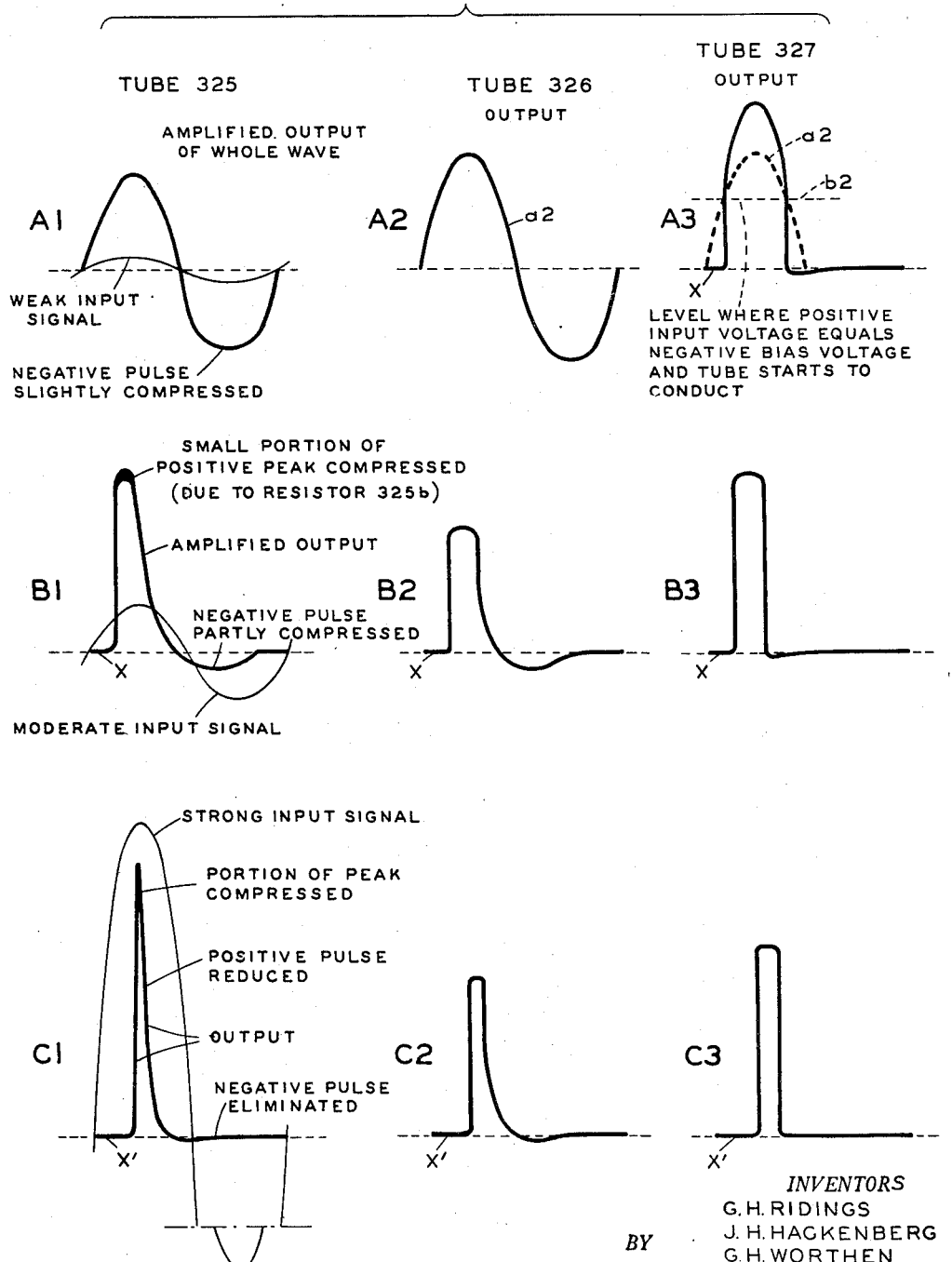

Figs. 36 and 37 consist of wave diagrams which indicate roughly the progress of signal waves of different levels through the recording amplifier.

The transmitter

The transmitter we used in a practical embodiment of our facsimile system is illustrated in Figs. 1 to 25 of the accompanying drawings. We shall first describe the mechanical construction of the machine, then explain the circuits which produce and amplify the facsimile signals as the stylus scans the subject copy to be transmitted.

Figure 3:
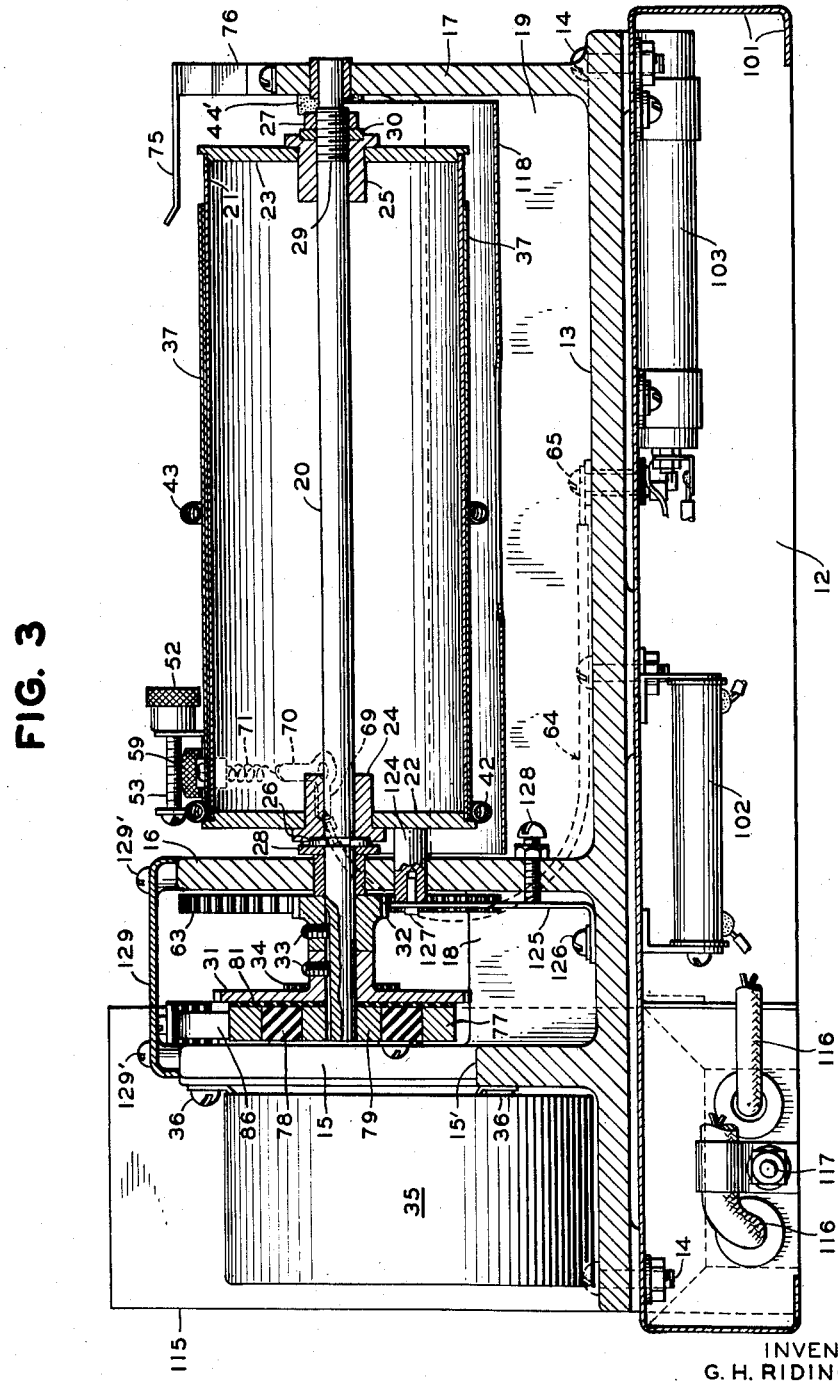
Fig. 3 is a longitudinal section on line 3—3 of Fig. 2.

Referring to Figs. 1, 2 and 3, there is a hollow base or chassis 12 of sheet metal on which a main casting 13 is mounted and secured in place at the corners by screws or bolts 14. The casting 13, preferably of aluminum, has three vertical plates or risers 15, 16 and 17. The plates 16 and 17 are rectangular (Figs. 4 and 12) but the left plate 15 is cut away at 15' (Figs. 3 and 15) to provide access to certain parts, as will appear later. The vertical plates 15 and 16 are connected at the rear by a rib 18 and another rib 19 connects the plates 16 and 17. The elements 15 to 19 are integral portions of casting 13 which constitutes a unitary supporting frame on the base of the machine.

A rotary shaft 20 is journalled in plates 16 and 17 (Fig. 3) and supports a scanning drum 21 which is a metal cylinder (usually a piece of aluminum tubing) supported on a pair of metal end disks 22 and 23. These disks are mounted on shaft 20 by means of bushings 24 and 25 through which the shaft passes loosely. The bushings 24 and 25 together with the parts mounted thereon are locked in position on shaft 20 by a key 26 at one end and a nut 27 at the other end. The key 26 is a slotted disk seated in a groove in shaft 20 and forming an abutment for bushing 24. A thrust washer 28 prevents unnecessary friction of slotted disk 26 against the bearing in plate 16. The right end of drum shaft 20 is screw-threaded at 29, so that the adjustment of nut 27 locks the drum assembly to the shaft to rotate therewith as a unit. A lock washer 30 holds the nut 27 in adjusted position.

It should be pointed out that the drum parts 21 to 25 are separate pieces which are separately mounted on shaft 20 as the latter is slipped into position from the left through supporting plate 16 to 17. It is only when the nut 27 is finally tightened that the assembled parts 21 to 25 are united into a single structure mounted on shaft 20 and rotatable therewith. The parts comprising the drum are of good conducting metal which is permanently grounded to the frame of the machine.

The left end of drum shaft 20 extends beyond the plate 16 and carries two gears 31 and 32 which are locked to the shaft by set screws 33. The large gear 31 is permanently in mesh with a pinion 34 fixed on the shaft of a small synchronous motor 35 which is mounted on plate 15 by screws 36. The operation of motor 35 is therefore always accompanied by rotation of the drum 21 at the required speed. In this particular machine, as used in our system, the scanning speed of the drum is low (for example, 50 R. P. M.). Because of certain limitations inherent in the small portable facsimile transmitter which was designed for economy, our system gives a more dependable operation at low transmitter speed. Of course, in the broader use of our transmitter the scanning speed of drum 21 can be raised to the required degree by varying the transmission ratio between the driving motor 35 and the drum shaft 20.

The drum 21 is adapted to support a sheet of paper 37 on which the subject matter to be transmitted has been recorded in conducting marks or characters. An example of a record conceivably made by a soldier in advanced position on a field of action is illustrated in Fig. 16 which requires no description. As shown in Fig. 22, the blank 37 is an especially prepared sheet of paper comprising a base stock 38 of conducting material or impregnated with such material (for example, carbon) and a top layer 39 of porous insulating material. This top layer may be a coating of suitable powder adapted to be scraped away or penetrated by the point of a writing instrument 40, such as a pencil of soft graphite.

Fig. 22 illustrates in an exaggerated way how the graphite pencil 40 makes conducting marks 41 on the insulating layer 39. Those marks, if properly made, penetrate to the conducting base 38 and make contact therewith. As we explain it, the minute particles of soft graphite scraped off the pencil by virtue of the pressure exerted in the process of writing fill the microscopic pores of the insulating layer 39 with conducting material which constitutes the record to be transmitted. We have, then, a sheet of paper with a conducting base stock and an insulating top surface on which the subject copy is written in conducting marks or characters. The unmarked area of the top surface 39 of the sheet may be called the background on which the marks appear.

The subject sheet or blank 37 is held on the drum 21 by spring garters 42 and 43 which roll easily along the drum to keep the sheet tightly wound up for scanning. As shown in Figs. 2 and 3, the end disks 22 and 23 of drum 21 project sufficiently beyond the drum to prevent the garters 42 and 43 from slipping off.

The upright cross plates 16 and 17 support a horizontal rod 44 on which a stylus carriage SK is slidably mounted in operative relation to the scanning drum 21. The ends of rod 44 are provided with resilient bumpers 44' (such as felt or rubber) to act as stops for the carriage. The construction of stylus carriage SK, as shown in Figs. 4 to 9, comprises in the main a bottom plate 45, an upper strip 46, a channel piece 47 and a block 48 of insulating material. The bottom plate 45 has a pair of depending ears 45' which have holes to receive the guide rod 44 in a smoothly sliding fit. The strip 46 has a pair of upstanding ears 46a and a depending tail 46b at the rear. A half-nut 49 is attached to the underside of plate 45 by screws 50 and 50'. The screw 50 also passes through the strip 46, which is secured to plate 45 by two additional screws 51. These screws also secure the channel piece 47 on top of strip 46. The ears 46a of strip 46 support an insulating finger piece 52 at the end of a cross pin or screw 53 for easy manipulation of the stylus carriage.

The insulating block 48 carries a cross pin 54 which is pivoted at its ends in the sides of channel piece 47. An adjustable bearing 55 (Fig. 8) makes it easy to mount the block 48 for a floating pivotal movement. This block has a groove 48' for receiving a spring strip 56 which is clamped in place by a plate 57, a screw 58 and a thumb nut 59. The spring strip 56 is bent down at its front end to hold a stylus 60, which is a short piece of steel wire fixed in position by solder 61 or otherwise.

Figure 4:
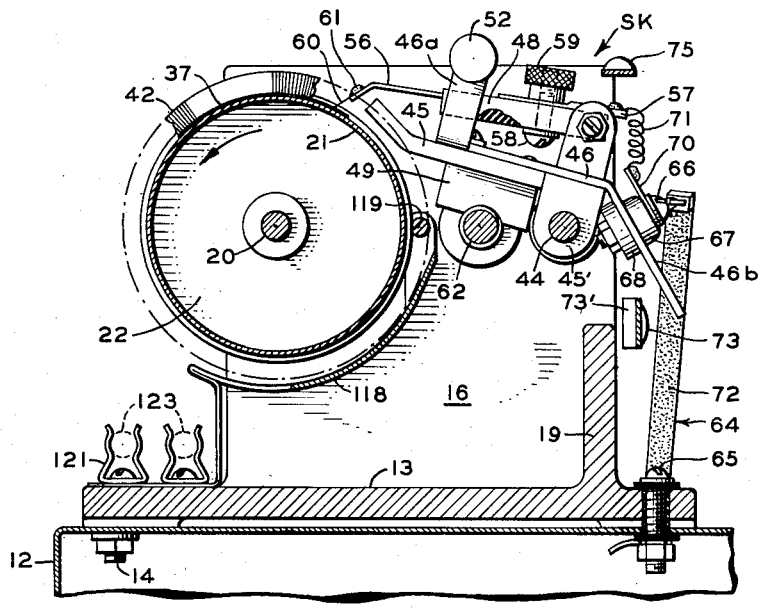
Fig. 4 is a transverse section on line 4—4 of Fig. 2 with the stylus carriage in forward or operative position.

It will thus be seen that the stylus 60 is pivoted on the insulating block 48 and is held by the spring strip 56 at the correct angle for scanning, as shown in Figs. 4 and 6. The weight of block 48 and the parts mounted thereon determines the pressure with which the stylus 60 bears down on the paper, this pressure being very light. For convenience the block 48 may be called the stylus holder.

When the stylus carriage SK is down in scanning position as illustrated in Figs. 4 and 6, the half-nut 49 engages a feed screw 62 which is journalled in the cross plates 16 and 17 in parallel relation to the drum 21. The left end of feed screw 62 extends beyond the plate 16 and carries a large gear 63 (Fig. 2) which meshes permanently with pinion 32 on the drum shaft 20. It is thus clear that when the synchronous motor 35 is energized it drives the drum 21 and the feed screw 26 simultaneously at their respective predetermined speeds as required in any particular installation. The finger piece 52 serves as a convenient handle for moving the stylus carriage to the two positions shown in Figs. 4 and 5. When the carriage is thrown back, the half-nut 49 is clear of the feed screw 62 and the carriage is free to be shifted by hand along the guide rod 44.

We do not depend on the weight of the stylus carriage SK to hold the half-nut 49 in firm engagement with the rotating feed screw 62 during a scanning operation. A constant downward pressure is exerted on the half-nut by a tensioned U-shaped leaf spring 64, which is fastened at its lower end to the base casting 13 by an insulated screw 65 (Figs. 2 and 4). The upper end of spring 64, which is usually of Phosphor bronze, is attached to the stylus carriage by means of an insulated connection shown best in Fig. 6.

A screw 66 is mounted on the tail extension 46b of strip 46 and insulated therefrom by washers or bushings 67 and 68 of Bakelite or similar material. A right angled connector having arms 69 and 70 (Fig. 2) is mounted on bushing 67 by the screw 66. The upper end of spring 64 is connected to arm 69 in any practical way, as by a conducting link, and the arm 70 is connected to the rear end of clamp 57 by a flexible conductor 71, which is soldered in place at both ends. It will be seen from this that the stylus 60 is electrically connected through the spring 64 to the insulated binding post 65, this connection being part of the stylus circuit to be described later. The spring 64 is preferably enclosed in a flexible insulating sheath 72.

The electrical spring connection 64 also performs the mechanical function of assisting to hold the half-nut 49 pressed down against the feed screw 62, as will be clear from Fig. 4. As the stylus carriage slides along the drum 21 from left to right during scanning, the upper end of spring 64 moves with it and the constant upward pressure of the attached spring tends to rock the carriage forward (leftward as viewed in Fig. 4) about the guide rod 44. This spring action maintains the half-nut 49 in firm driving contact with the feed screw 62. It is to be understood that the leaf spring 64 is sufficiently flexible to follow the movements of the stylus carriage.

Figure 5:
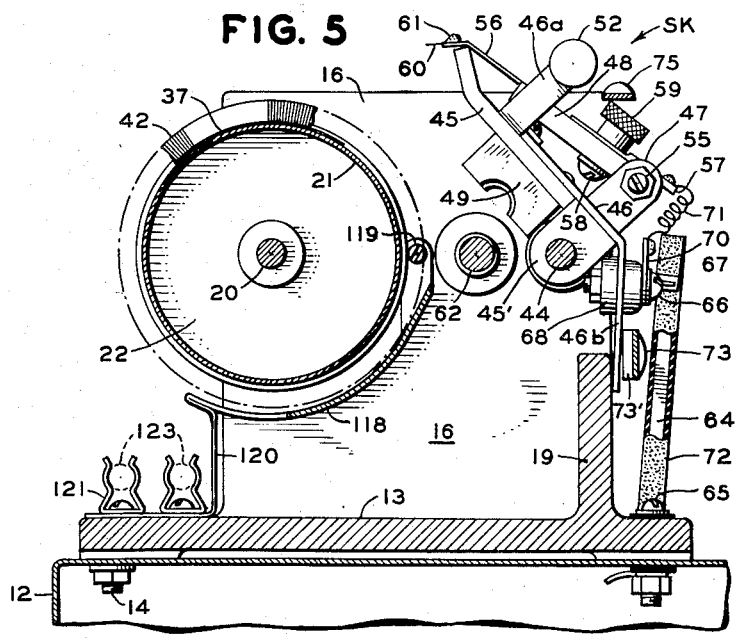
Fig. 5 is similar to Fig. 4 with the stylus carriage thrown back to rest position.

A comparison of Figs. 4 and 5 shows that when the carriage SK is down in scanning position, the stylus holder 48 is free to rock about its pivot 54 (Fig. 8) so that the stylus 60 is in pressure contact with the sheet on the drum. When the carriage is thrown back, the stylus holder rocks down with respect to the bottom plate 45 until the front end of arm 56 rests on the tip of the plate, as shown in Fig. 5. The carriage will not stay automatically in thrown-back position because it is overbalanced toward the drum 21 by its own weight and by the pressure of spring 64. We have therefore provided means for locking the stylus carriage in raised or rest position when required.

Looking at Figs. 12 and 13, there is a stiff spring latch 73 secured to the rear edge of plate 17 by screws 74. This latch extends leftward in spaced relation to rib 19 and terminates in a divergent tip 73'. When the stylus carriage SK is in raised position and is pushed toward the right, the tail 46b of the carriage frame rides along the rear rib 19 and is guided by the divergent tip 73' into automatic engagement with the latch 73 (Fig. 5). The carriage is now sustained in raised position, leaving the drum 21 free for reloading. By merely shifting the carriage to the left, the operator releases it from the latch 73 so that it can be lowered to scanning position.

Since our transmitter is a portable machine that may receive rough handling in transport, it is desirable to lock not only the frame of the stylus carriage in raised position, as above described, but also the stylus holder 48 which normally swings loose on the carriage frame. For this purpose we provide a separate spring latch 75 (Figs. 12 and 13) which is shown as a horizontal extension of an upright strip 76 attached to plate 17 by the screws 74. When the stylus carriage is shifted in raised position to the extreme right, the spring latch 75 engages the top of thumb nut 59 and bears down on it, so that the stylus arm 56 is held pressed against the tip of the carriage plate 45 (Fig. 5). In this way the entire stylus carriage SK is locked as a unit in raised position so that no part of it can flop around during handling or transporting of the machine.

As seen in Figs. 3, 14 and 15, a commutator ring 77 is attached to the face of gear 31 on the left end of drum shaft 20. The ring 77, of good conducting metal, is mounted on a ring 78 of insulating material, such as Bakelite, which carries a metal bushing 79. The nested annular parts 77—78—79 are forced together in a tight fit to form a unitary structure which is secured to gear 31 by screws 80 passing through the insulated ring 78. An insulating disk 81 is placed between the gear 31 and the ring 77 to insulate the latter completely from the machine.

The ring 77 is formed with a recess 82 in which a contact segment 83 is firmly seated and insulated by a lining or spacer 84. The parts 83 and 84 are preferably cemented in place by shellac or other suitable adhesive. A screw 85 passes radially through the segment 83 and through the rings 78 and 79 into contact with shaft 20, whereby the segment is permanently grounded to the metal framework of the machine.

The ring 77 and segment 83 are engaged by a pair of brushes or contact fingers 86 and 87 which are mounted on a suitable bracket 88 secured to the plate 15 by screws 89. The free ends of contacts 86 and 87 are so spaced that they just engage the ends of the grounded segment 83 at the same time. For distinction we shall designate the elements 86 and 87 as the phasing contacts.

As shown in Fig. 2, which is a top view of the front portion of the transmitter, the drum 21 has a line 90 scored down its length parallel with its axis. There is a certain angular relationship between the line 90, which engineers call the phasing line, and the commutator segment 83. When the operator mounts a sheet on the drum, the top of the sheet is to the left and the left edge 91 is placed to coincide with line 90, while the right edge 92 of the sheet overlaps the left edge. This precise mounting of the sheet on the transmitter drum is necessary for the proper framing of the facsimile copy recorded at the receiver. As we shall explain later, the phasing operation takes place during the interval when the stylus 60 crosses the blank space on the sheet between the borders 93 and 94 of the rectangle 95 which contains the subject matter to be transmitted.

Obviously, the angle between the phasing line 90 and the commutator segment 83 will depend upon the position of contacts of 86 and 87, which may be mounted differently in other designs of our machine. The best way to explain this relationship is to say (see Fig. 14) that when the phasing line 90 is on top, the contact 87 has just begun to engage the grounded segment 83. The reason for this will appear in the coming description of the phasing operation.

The rear portion of the sheet metal base 12, that is, the portion extending back of the casting 13, as shown in Fig. 1, serves as a mounting for the larger electrical elements of the transmitter circuits, such as a vibrator 96, a condenser unit 97, a transformer 98, a rectifier tube 99 and a keying tube 100. The circuit connections for these parts will be explained in the description of Fig. 23.

The small electrical parts of the transmitter circuits are housed in the shallow chamber 101 of base 12, as shown in Fig. 3. All the parts mounted in chamber 101 are not illustrated in the drawing, for in the actual machine this chamber contains resistors, condensers, binding posts, fuses and the necessary wiring. In Fig. 3, the parts 102 and 103 may be taken as representing the contents of chamber 101.

Figs. 1, 10 and 11 show suitable provisions for supporting the vacuum tubes 99 and 100 in firm position against vibration. There is a post 104 fixed on base 12 by a screw 105 and on this post are mounted a clamp 106 for tube 99 and another clamp 107 for tube 100. Each clamp is a sheet metal arm provided with a bushing 108 and 109, respectively, which are slidably mounted on post 104 for vertical adjustment. The post has two flattened sections 110 arranged at right angles to receive the ends of thumb screws 112 and 113. The free end of each clamp 106—107 is broadened to form a ring of spring teeth 114 adapted to engage the associated tube in firm pressure contact, as determined by the vertical adjustment of the clamps on post 104. This elastic clamping of the tubes in their sockets holds them in safe condition during transportation and handling of the transmitter. The thumb screws 112—113 not only clamp the tubes in safe position but can be loosened sufficiently to permit lateral swinging of the clamps out of engagement with the tubes, as when it is necessary to replace a tube. Any other practical supporting means for tubes 99 and 100 may be used.

As shown in Figs. 1 and 3, the base 12 is cut away at the left rear corner to support a small rectangular casing 115 which extends upward and provides a compartment for battery leads and output cables 116 when the transmitter is not in use. The casing 115 can be shaped from a single piece of sheet metal and secured to the base by one or more screws 117.

A curved guide plate 118 (Figs. 3 and 12) extends beneath the drum 21 closely concentric therewith to direct the sheets downward and forward around the drum, as indicated by the dotted line 118'. The guide 118 is a sheet metal piece secured at its sides to the casting plates 16 and 17 by screws 119. At its front edge, the paper guide 118 rests on a pair of brackets 120 which may be integral extensions of the guide plate or attached thereto as separate posts. Screws 121 secure the brackets 120 to the casting 113. We utilize the screws 121 to attach suitable clips 122 for holding graphite pencils 123 or like instruments with which the messages are written on the blanks. Extra pencils can be stored in the cable compartment 115.

It is best to keep a constant load on the scanning drum 21 and for that purpose we provide a brake 124 (Fig. 3) which is a cylindrical block slidably mounted in plate 16 and pressed against the drum end by a spring 125. This spring is an L-shaped blade secured to casting 13 by a screw 126. The upper end of spring 125 carries a pin 127 arranged to project into a hole in block 124 in a sliding fit. A screw 128 mounted in plate 116 is used to regulate the pressure of spring 125 against the brake block 124. The parts arranged between the plates 15 and 16 are enclosed in a sheet metal hood or cover 129 (Fig. 14) which is attached to the top of the plates by screws 129' for easy mounting and removal.

*The phasing operation at the transmitter (Figs. 17 to 21)*

The theory of our novel phasing operation from the transmitter end of our system will be understood from Figs. 17 to 21 which are of diagrammatic simplicity for clearness. We have already explained how the sheet 37 is folded over the drum for scanning. In Figs. 17 to 21 we shall assume that the drum 21 and the commutator ring 77 rotates synchronously in a leftwise direction as indicated by the arrows. In Fig. 21, it will be convenient to assume that the flattened out sheet 37 is stationary and that the stylus 60 moves rearward (away from the observer) along the straight path 130, which may be regarded as the starting line of the stylus.

Figure 17:
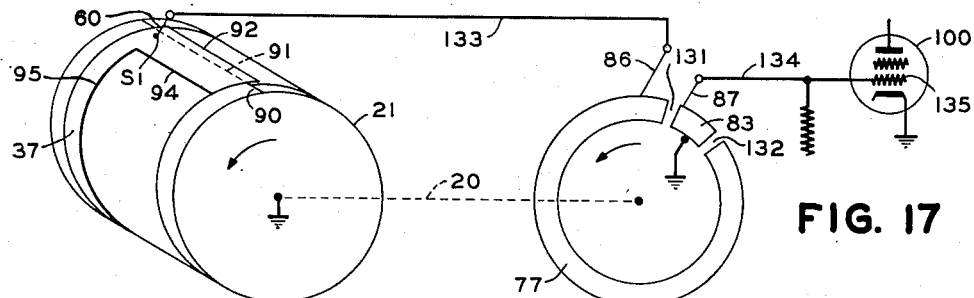

With the sheet 37 properly mounted on the drum 21, and with all other preliminaries taken care of, the operator places the stylus 60 anywhere on the starting line 130, which is a little to the left (that is, just outside) of the adjacent top border 95 of the mounted sheet. When the stylus reaches the point S1, as shown in Fig. 17, the angular position of the commutator ring 77 is such that the leading contact 86 is still engaging the ring and the trailing contact 87 has just started to ride over the grounded segment 83. This segment is shown in these diagrammatic figures as being insulated from ring 77 by air gaps 131 and 132 which represent the insulation 84 in Fig. 14. A wire 133 connects the stylus 60 with the leading contact 86 and a line 134 connects the other contact 87 with the control grid 135 of the keying tube 100. This tube, as will be explained later, controls the output of the radio transmitter associated with the machine.

For the present it will not be necessary to go into the operation of tube 100 in the transmitter circuits, as that will be taken up in the description of Figs. 23 and 24. We need only mention at this time that when the grid 135 is grounded through segment 83 a steady maximum direct current passes through the plate circuit of tube 100 which in turn causes the radio transmitter to send out a radio frequency signal. This steady signal endures for the length of the segment 83; that is, as long as the contact 87 rides over the grounded segment during the rotation of the drum.

Figure 18:
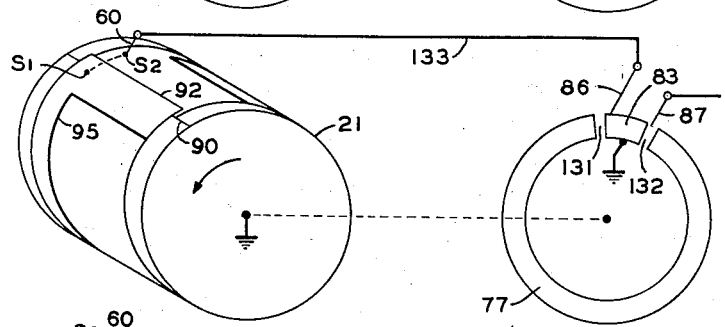

When the stylus reaches the position S2 in Fig. 18, the contact 87 slips off the segment 83 and removes ground from the grid circuit, thereby permitting normal negative bias to reach the grid 135 and cutting off the signal. This is the moment when phasing occurs, as will be explained in the description of the recorder circuits in Fig. 35.

Figure 19:
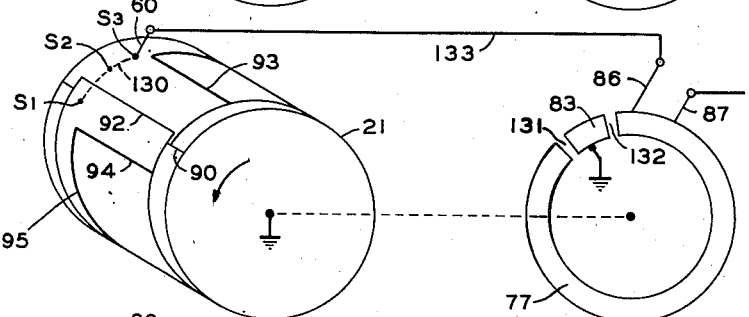
Figure 20:
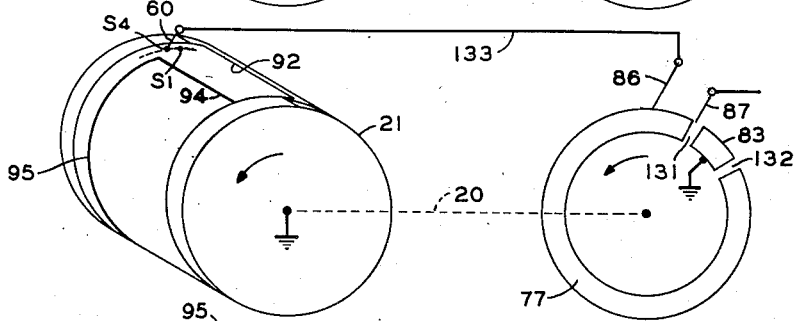

While the stylus moves from position S2 to position S3, as shown in Fig. 19, minimum direct current flows through the keying tube 100. At this point both contacts 86 and 87 engage the ring 77 and the stylus is connected to the grid 135 of this tube. Scanning of the intelligence area within the border 95 of the sheet now begins and lasts until the drum 21 and phasing ring 77 are in the position shown in Fig. 20, where the contact 87 has just left the ring 77 and opened the circuit of grid 135. Continued rotation of the drum brings the parts back to the starting position shown in Fig. 17, whereupon the phasing steps of grounding the grid and opening the grid circuit are repeated as previously explained.

It will be seen from the foregoing description that the commutator 77 sends out a phasing pulse or signal for each revolution of drum 21 during the brief interval when the stylus 60 traverses the vacant space between the border lines 94 and 93 of the sheet where its edges overlap. In this way the two machines are put in phase at the beginning of each revolution of transmitter drum 21. The part played by the receiver in this start-stop method of phasing will be described in connection with Fig. 35.

A few words should be said about the location of the stylus positions S1 to S4, which may be regarded as representing time intervals during the phasing cycle at each revolution of drum 21. The points S3 and S4 are spaced equidistantly (about one-eighth of an inch in the machine we used) from their respective border lines 93 and 94. The point S1 is spaced from the point S4 a distance equal to the width of the insulation between ring 77 and segment 83, so that S1 follows S4 almost instantaneously.

Considering the angular relationship between the successive stylus positions S1 to S4 and the grounded segment 83, it is clear that the stylus 60 takes control of the keying tube 100 shortly before it reaches the intelligence area (position S3, Fig. 19), so that the plate current in the tube will fluctuate in response to the scanning of the copy within the area 95'. This stylus control of tube 100 is maintained until shortly after the stylus leaves the message area (position S1, Fig. 17) when the stylus is disconnected from grid 135 and the grid is grounded, causing a steady maximum direct current to flow in the plate circuit of tube 100. This steady maximum current lasts until the stylus crosses the overlap of the sheet to position S2 (Fig. 18) which is slightly beyond the overlapping edge 92. At this point ground is removed from grid 135 and normal negative bias takes control of tube 100, causing steady minimum direct current to flow in the plate circuit.

To summarize the successive steps of the automatic phasing operation as depicted diagrammatically in Figs. 17 to 20 for each revolution of the drum, we have the following conditions:

1. Assuming the cycle to start at point S1 (Fig. 17), the circuit of stylus 60 is open and the grid 135 is grounded, whereby a steady signal or pulse of maximum direct current flows in the plate circuit of keying tube 100.

2. This signal lasts until the stylus reaches position S2 (Fig. 18) when the grid-to-ground circuit and the stylus circuit are both broken. This is the transition point from signal to no-signal and is the phasing moment of the system. It should be noted that the phasing moment occurs after the stylus has slipped off the double thickness of the overlap of the sheet.

3. When the stylus reaches the position S3 (Fig. 19) it is connected to the grid 135 of tube 100 and is ready to begin the scanning of the message in the intelligence area 95' of the sheet. (We are assuming here that the stylus has moved over into the message portion of the sheet on the rotating drum, as indicated by the dotted line 130' in Fig. 21.)

4. The stylus passes out of the message area at each revolution of drum 21 shortly before it reaches position S4 (Fig. 20), when the grid-to-ground circuit is opened. From the point S4 the stylus now repeats the successive positions shown in Figs. 17, 18 and 19 for the next phasing cycle.

*The transmitter circuits (Figs. 23–25)*

As we said before, all electric power for the transmitter comes from a small storage battery, which is indicated in Fig. 23 at 136. The battery leads go to the vibrator 96 and a suitable power switch 137 is included in one of the leads. This switch is usually mounted on the base of the machine, as shown in Fig. 2. The vibrator 96 is a standard commercial unit well known to electrical engineers and requires no description.

A transformer 138 comprises a primary coil 139 and two secondary coils 140 and 141. The primary 139 receives the output of vibrator 96 which converts the battery current (usually six volts) into a 110-volt, 60-cycle alternating current. The secondary 140 drives the synchronous motor 35, which is shown here as being of the drum type. A resistor 142 and condenser 143 serve to improve the wave shape of the alternating current supplied to the motor. A phase shifting condenser 144 is employed in the starting winding of the motor, which runs at constant speed to drive the drum 21 and the phasing commutator 77.

The secondary coil 141 supplies alternating current to the full-wave rectifier tube 99, which is mounted on the base of the machine (Fig. 1). This tube contains the usual elements consisting of two plates or anodes 145 and 146, a cathode 147 and a heater 148. The latter receives current from the battery conductors 149. A condenser 150 connected across the secondary 141 serves to reduce excessive voltage peaks and sparking at the vibrator contacts.

The cathode 147 of rectifier tube 99 is connected by a wire 151 to the screen grid 152 of the beam-power keying tube 100, which also is mounted on the base of the machine, as previously explained. The middle point of the secondary 141 is connected by a wire 153 to the control grid 135 of tube 100 through a resistor 154. For purposes of description, the wires 134 and 153 may be considered as being joined at point 155 from which a connection goes to the grid.

A pair of resistors 156 and 157 in combination with the condenser unit 97 (in reality two condensers within a cylindrical casing) constitute a resistance-capacity filter associated with rectifier 99 to provide D. C. grid and screen potentials for tube 100. These potentials are determined by resistors 158 and 159, which are connected in series across the lines 151 and 153. The resistors 158 and 159 constitute a voltage divider and the resistor 159 is adjustable by a tap 159' to regulate the voltage as required. The resistor 158 determines the potential for the screen grid 152 and resistor 159 provides the grid bias. The heater current for tube 100 comes from the battery leads 149.

The plate 160 of tube 100 is connected to an output lead 161 and the other output lead 162 is grounded. The cathode 163 is connected to lead 162 which goes to point 164 between the resistors 158 and 159. The conductors 161 and 162 constitute the output cable of the keying tube 100 and this cable is connected to the cathode circuit of the R. F. oscillator tube in the portable radio transmitter 165.

It is not necessary to show or describe the details of this transmitter because such devices are well known and understood. So we need only mention that the transmitter 165 contains an oscillator tube 166, a crystal 167 connected to the control grid of the tube, and an oscillator tank 168 connected to the plate of the tube. The plate circuit of keying tube 100 is completed through the output cable 161—162 and the cathode circuit, returning by way of the grounded and shielded side of the cable. The signals passing through the plate circuit of tube 100 are sent out by the radio transmitter on its assigned carrier, as will be understood without further explanation.

Let us now see how the scanning of the message on sheet 37 by the stylus 60 controls the keying tube 100. For this description we shall refer to the simplified diagram of Fig. 24 which is really a part of Fig. 23 in rearranged form for easy understanding. The numerical voltages indicated in Fig. 24 are merely by way of example to show the positive and negative relationships between the conductors. Thus, the grounded conductor 162 is negative with respect to the plate conductor 161 but is positive with respect to conductor 153 which is at negative voltage. Although the given voltage numbers were actually used in one embodiment of our system, those numbers are not to be taken in a restrictive sense but solely for purposes of description.

The five voltages indicated in Fig. 24 by the symbols V1 to V5 represent the following conditions:

The voltage V1 between the points 164 and 159' is determined by the setting of the potentiometer tap 159' and is the negative bias voltage applied to the control grid 135. Once this voltage has been adjusted it remains constant.

The voltage V2 between lines 151 and 162 across the resistor 158 represents a suitable potential maintained between the screen grid 152 and the cathode 163 of tube 100. This screen grid voltage primarily determines the amount of current that will flow in the plate circuit of the tube.

The voltage V3 between the screen conductor 151 and the negative conductor 153 across the entire resistor 158 and a portion of potentiometer 159 is obtained from the rectifier 99 of the facsimile transmitter, as explained before. This voltage supply between the screen grid 152 and cathode 163 is relatively constant.

The voltage V4 between the control grid 135 and cathode 163 is a variable negative quantity depending upon whether the stylus 60 is on a mark or on clean paper, as we shall presently explain.

The voltage V5 between the conductors 161 and 162 is obtained from the radio transmitter 165 and will vary in proportion to variations in voltage V4.

Referring to Fig. 24, the effective resistance as measured across the thickness of the scanned sheet between the stylus point 170 and the grounded point 171 (which actually is the metal drum 21) will be called the paper resistance. Obviously this resistance is highest when the stylus is on clean paper—that is, when touching an unmarked spot on the insulating top layer 39, and is lowest when the stylus is on a conducting pencil mark 41.

It should be noted that the paper resistance is in shunt to the grid-cathode path 172. When the stylus 60 scans an unmarked spot, there is only a minimum flow of plate current in tube 100 because the paper resistance is very high and the control grid 135 is at a very negative potential. This minimum or no-signal current also flows through the oscillator tube 166 of the radio transmitter, since the plate cathode path of tube 160 constitutes a series resistance in the cathode circuit of tube 166. The value of this minimum current, which is primarily determined by the adjustable resistor 159, is just sufficient to keep the crystal 167 in the radio transmitter 165 vibrating at all times so as to maintain the oscillator tank 168 in an oscillating condition, but this minimum current is not high enough to operate the radio transmitter for facsimile transmission. This minimum or no-signal current may be called the "keep alive" current for the radio oscillator.

When the stylus 60 rides over a conducting mark 41, the paper resistance is so low that the control grid 135 is grounded and is therefore at zero potential. This allows a maximum current flow across the plate-cathode path in tube 100 and facsimile signals are sent out by the radio transmitter 165 corresponding to the marks on the scanned sheet. How those signals affect the distant receiver will be explained at the proper time.

In describing Fig. 24, we assumed that the stylus 60 was directly connected to grid 135 of tube 100. This condition remains during the scanning of the message when the phasing contacts 86 and 87 are both on ring 77, as shown in Fig. 23. During the phasing operation, as we have seen, the grid 135 is grounded while the stylus passes from point S1 to S2 (compare Figs. 17 and 18) and during this grounded condition of the grid there is a maximum current flow in tube 100. This high current, as already explained, causes the radio transmitter to send out a signal which lasts until the grid-to-ground circuit is opened (Fig. 18). It will be seen, then, that grounding the grid during the phasing operation produces an effect similar to that which occurs when the stylus passes over a marked area during the scanning cycle, except that grounding the grid by segment 83 produces a slightly higher current than the scanning of marks by the stylus. This difference in current is present because the resistance of a mark on paper with a conductive body is slightly higher than a metallic path to ground.

We prefer to use an amplifier tube of the beam-power type because these tubes in general have a low screen-grid current, high efficiency and a high power output. By using a screen voltage of high value (V2 is indicated as 165 volts in Fig. 24) we can make the plate current relatively high, which is desirable in our system because the plate voltage is limited to a low value (for example, 55 volts) by the characteristics of the small portable radio transmitter 165.

The best operation of the radio transmitter 165 requires a large plate current swing in tube 100 and that requires a maximum change in the grid voltage. For this purpose the bias voltage VI is so adjusted by potentiometer 159 that the tube 100 is almost cut off when unmarked areas or background specks on the sheet are being scanned, and a low current is flowing. When a conducting mark is being scanned, the paper resistance is so low as compared with the resistor 154 that the grid 135 is grounded and this decrease in negative voltage V4 allows the tube to pass a high current which causes the radio transmitter 165 to send out corresponding facsimile signals. In effect then, the tube 100 is turned on when the stylus is on a mark and is turned off when the stylus is on clean paper.

A modified form of keying network involving our invention is shown in Fig. 25. Here, as in Fig. 24, the screen grid 152 is connected to the plus terminal 174 and the control grid 135 is connected to the negative terminal 175 of the power supply from rectifier 99. This voltage, as heretofore stated, is fairly constant. The cathode 163 goes to the grounded wire 176. An adjustable resistor 177 of high value is connected between wires 153 and 176 in shunt to the stylus 60. The resistance of element 177 is very high relatively of the resistance of a pencil mark in the stylus circuit.

The value of resistor 177 is so adjusted that, when the unmarked background of the paper is under scanning, the voltage between lines 153 and 176 will either hold the current in tube 100 to a minimum value or cut the tube off completely. A rheostat 178 connected across the output leads 161 and 162 may be used to maintain the low current of tube 100 during background scanning to a minimum "keep alive" value for the purposes previously explained.

When pencil marks are being scanned, the resistance between the stylus 60 and the grounded drum 21 is so low that the high resistor 177 is effectively short-circuited and the control grid 135 is grounded. The voltage between lines 153 and 176 is thus reduced to a very low value, while the voltage between lines 151 and 176 increases nearly to the full potential of the power supply. As a result of this great increase of the voltage of screen grid 152 and the removal of negative grid bias, the tube becomes highly sensitive and the plate current is made very large. This signal output is sent to the radio transmitter 165.

We would call particular attention to a low-pass filter associated with the screen grid 152 in Fig. 25, this filter comprising resistors 179 and 180 in line 151 and condensers 181 and 182 connected between the screen grid and the cathode 163. This filter slows down the build-up of the screen-grid voltage and thereby prevents or reduces the transmission of background of the high-frequency impulse type, such as spots on the paper, for instance. It goes without saying that this filter should be so designed that the finest lines scanned by the stylus will be transmitted without deterioration. A fixed resistor 183 of chosen value is inserted in line 184 to act in combination with the adjustable resistor 177 as a voltage divider to furnish the proper grid bias and screen-grid voltage so as to give the tube the desired sensitivity.

*The recorder (Figs. 26 to 34)*

The facsimile recorder used in our system operates with a reciprocating stylus which records on a continuous sheet. A facsimile recorder of that type is disclosed in the Wise and Parrott Patent No. 2,311,803. Our present machine, as will appear, embodies certain improvements over the apparatus of that patent. The recorder herein disclosed is a portable self-contained machine requiring only a separate power supply unit.

Referring especially to Figs. 26, 27, 28 and 31, the hollow base 185 of the machine carries a casting 186 which constitutes the main support of the recording mechanism. The casting 186, usually of aluminum, comprises a bottom plate 187 and a pair of upright sides 188 and 189 running transversely of the machine. A web 190 connects the sides in front and has integral lugs 191 projecting forward to receive fastening screws 192. The side plates 188 and 189 are provided each with bracket arm 193 and 194, respectively, projecting forward and upward at a certain angle. The bracket arms 193 and 194 may be integral with the side plates or attached thereto as separate pieces.

A metal platen 195 is mounted on a shaft 196 which is journalled in the cross plates 188 and 189 of the main casting. A small motor 197 is connected to shaft 196 through a suitable reducing drive which is represented in Figs. 26 and 28 by gears numbered 198 to 201. The gear 198 is fixed on the motor shaft 202 and the final large gear 201 is on the platen shaft 196. The motor 197 may be any suitable step-feed device for actuating the platen 195 intermittently from line to line at predetermined intervals, or it may be an ordinary motor for turning the platen continuously at very low speed during a scanning operation to give the desired line spacing.

In the receiver shown in the drawings, which illustrate a machine as actually constructed and operated, the motor 197 is a small step-feed device obtainable in the market and not necessary to explain in detail. For the purposes of this description it will be sufficient to point out (referring momentarily to Fig. 35, upper right corner) that the motor 197 comprises a solenoid 203 adapted to operate an arm 204 which carries a pawl 205 arranged to actuate a ratchet wheel 206 on the motor shaft 202. Every time the solenoid 203 is energized, the ratchet wheel 206 is kicked ahead one tooth and this motion is communicated to the platen 195 in greatly reduced ratio. This advance of the platen is usually of the order of 0.01 of an inch, which is the distance between two scanning lines.

The platen 195 is provided with peripheral pins 207 at each end arranged to be engaged by perforations 208 and 209 in a continuous sheet of recording paper 210 which is wound on a supply roll 211. It will be observed that while the round perforations 208 fit snugly over the pins 207, the other perforations 209 are axially larger than the pins, thus allowing for variations in the width of the paper which is thereby always supported smoothly on the platen.

The supply roll 211 is carried by a rotary shaft 212 which is supported in notches 213 of plates 188 and 189 at the rear of the machine (Figs. 26 and 31). These open bearing notches permit easy removal and renewal of the paper supply rolls. A friction pad 214 carried by a spring arm 215 is constantly pressed against a ring or collar 216 on shaft 212 as a continuous load thereon to keep the paper taut as it unwinds. Grooved rollers 217 (usually of Bakelite) mounted over the platen 195 straddle the pins 207 to hold the paper in driving engagement with the pins (Fig. 31). These retaining rollers are supported on studs 218 attached to the cross plates 188 and 189.

It is clear from Fig. 31 that as the platen 195 is rotated by the motor 197 (whether intermittently or continuously) the pins 207 pull the recording paper 210 off the supply roll 211 and move it around the drum toward the rear of the machine. A hand wheel 219 on the left end of shaft 196 permits manual advance of the paper for a purpose that will appear later. The driving conditions between shaft 196 and motor 197 are such as to permit this manual operation of platen 195.

Referring particularly to Figs. 27, 28 and 31, the slanting arms 193 and 194 carry insulating blocks 220 and 221, respectively, which are attached by screws 222 and 223. These blocks support a pair of rails 224 which form a track for a slidable stylus carriage 225. The rails 224 are channel bars facing each other to form a chamber 226 and slightly spaced to provide a slot 227 for the carriage. The left end of track 224 is secured to block 220 by a screw 228 (Fig. 28) which passes through both rails and an interposed spacer 229 into the block. The thickness of spacer 229 determines the width of slot 227.

The right end of track 224 is supported in a special way so as to leave the chamber 226 and slot 227 unobstructed for the insertion of the stylus carriage 225. As best illustrated in Figs. 27A and 31, a bracket 230 is secured to the top of plate 189 by screws 231 and this bracket has a depending extension 232 to which an L-shaped insulating block 233 is attached by bolts 234. A screw 235 secures the upper rail 224 to the bottom of block 233 and a screw 236 fastens the lower rail to the top of block 221. The screw 235 also acts as a binding post for the insulated metal track 224.

The stylus carriage 225, which is operatively supported on track 224, is best shown in Fig. 32 on a greatly enlarged scale for clearness. There is a thin metal plate 237 provided with cylindrical projections 238 so dimensioned and arranged as to guide the plate through the track chamber 226 in a smoothly running close fit. The guide pieces 238 may be hollow buttons which are secured in pairs on opposite sides of plate 237 by a pin 239 (Fig. 31). An integral extension 240 on carriage plate 237 supports a spring arm 241 which carries on its free end 242 a small metal tube 243. A simple way to attach this tube is to coil the free end 242 of arm 241 around it and solder it in place, as shown in Figs. 32 and 33.

Through the center hole of tube 243 passes a wire 224 which is bent out at its ends 245 and 246 to lock it in place. This wire, which may be a piece of piano wire, turns freely in tube 243 but without wobbling and the upper end 245 constitutes the recording stylus of the machine. The turning movement of stylus 245 is limited by a stop bracket 247 secured to arm 241. This bracket has a slot or recess 248 through which the stylus 245 projects and the two sides of this slot constitute stop shoulders against which the stylus bears as it trails across the paper on the platen in its forward and return movements. This will be better understood when we explain the operation of carriage 225.

The carriage plate 237 extends through the slot 227 in track 224 as can be seen in Figs. 27 and 31, and the inclination of the track is such that the stylus extends radially toward the platen 195. This mounting of the stylus in front of the platen leaves the paper exposed for easy reading of the recorded copy as it rises from the scanning stylus. The parts comprising the stylus carriage 225 are made of good conducting metal (such as brass or bronze) and the metal track 224 keeps the moving stylus 245 electrically connected to the binding post 235.

We shall now describe the mechanism for operating the stylus carriage 225 along the rectilinear track 224. Referring to Figs. 26 and 27, at the right of the machine there is a casing 249 which contains a synchronous motor 250 with its shaft 251 extending upward. The casing 249 supports a casting which has a base plate 252 and a pair of uprights 253 and 254 arranged in front and back, respectively. These uprights support a transverse shaft 255 which carries a gear 256 arranged to mesh with a pinion 257 on the motor shaft 251.

As seen in Fig. 29, the front end of shaft 255 has fixed thereon a hub 258 which has an axial groove or recess 259. A wheel 260 is mounted on hub 258 between a pair of friction washers 261 and 262 which are slidable on the hub but locked against rotation thereon by means of keys which enter the groove 259.

A metal disk 263 is secured on the front end of hub 258 by screws 264 and another disk 265 is slidably and rotatably mounted on the rear end of the hub. A spider spring 266 or the like is mounted on shaft 255 between the disk 265 and a collar 267 fixed on the shaft. The spring 266 constantly pushes against the disk 265 so that the wheel 260 is firmly held between the washers 261—262, which thus constitute a friction clutch for yieldably connecting the wheel to the synchronous shaft 255. This friction drive permits the wheel 260 to be held stationary during certain intervals, as we shall presently explain.

The wheel 260 operates the stylus carriage 225 through a cord or string 268 (preferably a length of fishing line) which is attached in any practical way. In the present instance one end of the cord is fastened to a slotted lug or clip 269 on wheel 260 (Fig. 30) and the other end is hooked in a slot 270 of carriage plate 237 (Fig. 32). It is clear from Fig. 27 that leftwise rotation of wheel 260 winds up the cord 268 and pulls the stylus carriage from left to right. Since the driving wheel 260 is operated by the synchronous motor 250, the latter may be called the stylus motor and we shall designate it as such hereinafter.

As shown in Figs. 29 and 30, the wheel 260 carries a tripper 271 which is an angle piece formed with a cam edge 272 and adjustably held in place by a set screw 273 passing through a slot 274 in the wheel. When the cord 268 encounters the tripper 271 as the wheel rotates, the cam edge 272 pushes the cord laterally off the wheel at a predetermined moment. This will be more fully explained when we describe the operation of the machine.

The wheel 260 carries a tooth 275 which projects radially beyond the periphery (Fig. 30) to engage a stop arm 276 pivoted at 277 on a bracket or frame 278. This frame has an extension 279 (Fig. 27) secured to the front upright 253 of casting 252 and carries a magnet 280 for operating the arm 276, which is of soft iron or else has an armature piece attached to it. When the magnet 280 is energized, it moves the arm 276 out of contact with stop 275 and thereby releases the wheel 260 for operation by the synchronous motor 250. A coil spring 281 normally tends to rock the arm 276 clockwise into the path of stop 275. A set screw 282 may be used to adjust the normal position of arm 276. The magnet 280 will be designated in the description as the phasing magnet for reasons that will appear later.

The drive wheel 260 carries a pin 283 at the back (Fig. 28) arranged to operate a switch arm 284 which is part of a unitary switch device 285 mounted on the upright 253 by means of a bracket 286 (Fig. 26). The switch 285 may be of any approved type found in the market, so that no description of the switch is necessary. We need only say that the switch 285 is normally open and is closed when the pin 283 moves the arm 284 rearward (to the left in Fig. 28). When the switch arm 284 is released by the pin 283, it automatically moves forward to open position.

A word should be said about the angular relationship of the three parts 271, 275 and 283 carried by the peripheral portion of the stylus drive wheel 260. Referring to Fig. 30, when the tooth 275 is in stop position 275', that is, when the wheel 260 is held stationary, the tripper 271 is in vertical position 271' and the pin 283 engages the switch arm 284 to close the switch 285. This position of wheel 260 is shown in Fig. 27. The cord 268 slips off the wheel 260 and the stylus carriage 225 arrives at the end of its forward movement just before the tripper 271 in Fig. 30 reaches the vertical position 271', when the wheel is stopped by the magnet arm 276. The slipping-off position of the cord is indicated at 268' in Fig. 29. The wheel 260 is held in stationary position until the phasing moment of the machine when the magnet 280 is energized. The phasing operation of the receiver will become clear when we reach the circuit diagram of Fig. 35.

The moment the cord 268 slips off the drive wheel 260, the stylus carriage 225 is automatically snapped back to starting position at the left, as shown in Fig. 27, by a retractor mechanism mounted on the left end of the machine. Referring to Fig. 28, a rod 287 is rigidly supported at its ends in brackets 288 and 289 on the side plate 188. The front bracket 288 is mounted on the front end of the slanting arm 193 and the rear bracket 289 is secured to the face of plate 188 along its rear edge. The stationary rod 287 has wound thereon a coil spring 290 of the shade roller or torsion type which has its rear end attached to a collar 291 fixed on the rod. The front end of spring 290 is fastened to a reel 292 rotatable on rod 287 and arranged in alignment with the drive wheel 260. The reel 292 carries a cord 293 which is hooked at its outer end in a slot 294 of the carriage plate 237 (Fig. 32).

As the stylus carriage 225 is moved forward to the right by the wheel 260, the reel 292 pays out the cord 293 and its rotation winds up the torsion spring 290. When the cord 268 is pushed off the wheel 260 by the tripper 271, the tensioned spring 208 instantly whips the stylus carriage 225 back to starting position. In the particular form of recorder we are describing, the motor 250 is so geared to wheel 260 that it takes the stylus approximately only one second to move from start to finish of one line and back to start of the next line. A cross-pin 295 (Fig. 26) in track 224 forms a stop to limit the return movement of the carriage, which is cushioned by felt or otherwise.

During the reciprocating movements of carriage 225, the stylus 245 automatically adjusts itself to a trailing position, as will be clear from Fig. 33. When the stylus travels forward (from left to right) it trails as shown in full lines, and during the return movement it trails in the dotted position 245'. The spring arm 241 allows the stylus to adjust itself automatically to either trailing position by a rocking or toggle motion which is limited by the slot 248. This novel mounting of the reciprocating stylus makes it unnecessary to lift it off the paper during the return of the stylus carriage and lower it again for the scanning movement, thereby simplifying and speeding up the operation of the machine.

As seen in Figs. 26 and 28, there is an electromagnet 296 mounted on a post or bracket 297 projecting upward from the base plate 252. The magnet frame 298 carries an insulating block 299 which supports a pair of contacts 300 arranged to be closed by an armature 301 when the magnet is energized. A spring 302 normally holds the armature away from the contacts 300 which we shall designate as the starting switch for the synchronous motor 250. The circuit connections of magnet 296 and switch 300 will be explained in the description of Fig. 35. We usually put a cover 303 over the casting plate 252 to enclose the magnetic switch assembly and other parts mounted on the casting.

As the endless sheet 210 is fed rearward off the platen 195 during a recording operation, it passes over an inclined apron 304, as shown in Figs. 26 and 31. This apron consists of a single sheet of metal shaped to have an angle bar 305 fitting over the rear corners of plates 193 and 194 to which the bar is secured by screws 306 and 307. The apron 304 extends down close to the platen 195, its terminal edge being indicated by the dotted line 308 in Fig. 26. A cutter bar or knife 309 is attached to the apron 304 parallel to the platen 195 and slightly spaced from the apron by small end pads 310 (Fig. 31) so that the paper passes between the knife and the apron. The front edge of cutter bar 309 is turned up to facilitate the insertion of the paper. To tear off a recorded message the attendant grasps the free edge of the sheet and pulls it along the cutting edge of the knife 309. The hand knob 219 enables the attendant to advance the sheet until all of the recorded copy is beyond the knife before tearing it off.

Behind the casing 249 and the parts it supports is another casing 311 which contains various electric devices used in the recording amplifier circuits of Fig. 35, where those devices appear in diagrammatic outline. At this point we shall only describe the manual control elements mounted on the top panel 312 of the casing 311, as best shown in Fig. 26, for operating the devices in the casing.

A switch 313 connects the power unit of the machine to a source of A. C. power. A start button 314 enables the operator to energize certain circuits which prepare the machine for operation. A phasing switch 315 has two positions, one for start-stop phasing and the other for synchronous phasing. Likewise, an oscillator switch 316 has two positions corresponding to the positions of the phasing switch 315. For start-stop phasing the oscillator switch is in position 316a and for synchronous phasing it is placed in position 316b.

A knob 317 controls an oscillator condenser by a vernier arrangement comprising a dial 318 and a pointer 319. The dial 318 is operated directly by the knob 317 and the pointer 319 is geared to the dial in a greatly reduced ratio. In the particular machine we built and operated, this ratio was 20 to 1; that is, the dial 317 rotated ten times for a half circle movement of the pointer 319. By adjusting the knob 317, the operator can vary the speed of the synchronous motor 250 for start-stop phasing operation.

There are two additional finger pieces and associated dials on the control panel 312 marked 320 and 321 for adjusting certain potentiometers in the recording amplifier. The finger piece 320 controls a noise rejector and the other finger piece 321 controls the recording level of the received signal voltage. The various operations of the manual controls shown on panel 312 in Fig. 26 will be fully described in connection with the circuit diagram of Fig. 35.

The hollow base 185 of our portable receiver also carries the various electrical parts for certain electronic units included in the operational circuits of the machine. Turning to Fig. 26, we see a number of vacuum tubes and transformers mounted on the rear portion of the base to the left of the control panel 312. These electrical parts are divided into three groups representing a recording amplifier 322, a phasing amplifier and control unit 323, and a synchronous motor amplifier 324.

In this particular system the recording amplifier 322 has five vacuum tubes numbered 325 to 329 and a signal output transformer 330. A gain control dial 331 is also mounted on the base for regulating the power level of the transformer 330 to which the recording circuit is connected, as will appear later.

The phasing amplifier and control unit 323 has two vacuum tubes 332 and 333 mounted on base 185 together with a phasing control dial 334 which regulates the control grid bias of tube 332 which is a pentode. It may be stated here that the adjustment of dials 331 and 334 is done at the factory and constitutes a permanent maintenance adjustment which is not supposed to be disturbed by the operator.

The synchronous motor amplifier 324 has three vacuum tubes 335, 336 and 337 and an output transformer 338 which feeds the synchronous motor 250 housed in the adjacent casing 249. The parts comprising the electric connections for the units 322, 323 and 324 are contained in the shallow chamber 339 of base 185 (Fig. 27), such parts including the necessary condensers, resistors, electromagnets, connections, and so forth. In Fig. 27 we have represented a few of those parts in conventional outlines 340.

It will thus be seen that our recording machine is a portable compact unit complete in itself except for the power supply which is contained in a separate portable box. This power unit is not illustrated in the mechanical views because it is a well known standard device, but it is indicated schematically in the circuit diagram of Fig. 35 which is now to be described.

The recorder circuits (Fig. 35)

The power for the operation of the circuits of the recorder comes from a conventional source of 115-volt 60-cycle alternating current indicated in Fig. 35 by a pair of bus bars A and B which feed into a power unit 341 for furnishing direct as well as alternating current of the required voltages. As this power unit is a well known electric device we need only say that it includes a transformer 342, a rectifier 343 with the usual filter, and the conventional voltage regulation.

The transformer 342 comprises a primary coil 344 and three secondary coils 345, 346 and 347. The primary coil 344 is connected to the bus bars A—B by leads 348 and 349. The secondary 345 goes to the input terminals 350 of the rectifier 343 which has two output terminals 351 and 352 of direct current. Both of those terminals have positive potential and for distinction we shall refer to 351 as the 400-volt terminal and to 352 as the 250-volt terminal. This last-named voltage is regulated. The return circuit of the rectified voltage is through the grounded terminal 353. Let it be noted that the voltage figures just given (like all others in this description) are mentioned merely as examples of actual voltages used.

The secondary coil 346, which usually gives about six volts, goes to the filaments of the various tubes used in the receiver circuits. The third secondary coil 347 supplies the power (usually 12 volts) to the starting motor 354 over lines 355 and 356. Actually the motor 354 is a structural part of the synchronous motor 250. These two motors are embodied in a single piece of apparatus which is available in the market.

The recording amplifier

We have already mentioned that the recording amplified utilizes five vacuum tubes numbered 325 to 329. The characteristics and interstage connections of these tubes are such that the amplifier not only amplifies the received signals but also performs the automatic functions of power level control, noise rejection, signal wave shaping and the uniform limiting of signal output with a wide variation of input level. The first three tubes 325, 326, 327 are pentodes with a novel form of coupling and operation to be presently described. Tubes 325 and 326 have a remote cut-off, while tube 327 has a sharp cut-off. The fourth tube 328 of the amplifier is a dual triode which operates as a limiter and wave shaper of signals over a wide range of input level and frequencies. The final tube 329 is a beam-power tube connected to the output transformer 339 which supplies the recording voltages to the stylus 245. The plate circuits of all the tubes 325 to 329 are connected to the 250 volt D. C. terminal 352 of the power unit through lines 357, 358 and 359. The conductor 360 represents the common ground of the tubes.

At the input end of the recording amplifier is a jack 361 into which is plugged the shielded output cable 362 of a portable radio receiver 363. The spring contact of jack 361 is connected to the control grid 364 of tube 325, which is therefore operated by the input voltages picked up by the radio receiver. These voltages comprise not only the facsimile signal voltages sent out by the radio transmitter 165 but also the lower noise voltages which modify the signal wave. The circuit connections between jack 361 and the control grid 364 include a D. C. blocking condenser 325a, a resistor 325b, a grid bias condenser 325c, and a high resistor 325d which controls the discharging time of the bias condenser. A load resistor 325e constitutes the input impedance of the amplifier.

Resistors 325f and 325g determine the value of the voltage impressed on the screen grid 364a of tube 325 from the supply conductor 359 which in this case is at +250 volts and which also supplies power to the plate 364b of the tube across a resistor 325h. It is important to point out that in this particular application of tube 325 the voltage on screen grid 364a is of low value as compared with the plate voltage. For example, in the present embodiment of our invention the resistors 325f and 325g are of such values as to fix the voltage on screen grid 364a at 1 or 2 volts positive. This low screen voltage and the value of resistor 325h are the chief factors that so determine or adjust the operating characteristics of tube 325 as to make its cut-off more gradual and therefore cause the recording amplifier to work with a wide variation of input signal strength.

As we saw in the description of the transmitter end of our system, a phasing pulse is sent out by the radio transmitter 166 at each revolution of drum 21 and a signal pulse is transmitted every time the stylus 60 scans a black mark on the message copy. Each phasing pulse and scanning signal picked up by the radio receiver 363 charges the condenser 325c across the low resistor 325b very rapidly to the maximum amount for the particular signal level of the moment. This condenser charge is impressed on the control grid 364 of tube 325 as a negative bias which determines the amplification of the tube.

On weak signals the charge on condenser 325c is small and therefore the negative bias on grid 364 is low, whereby the amplification of tube 325 is correspondingly high. When strong signals are received, the charge on condenser 325c is high and the resulting high negative grid bias keeps the amplification of the tube down. In consequence, the tube 325 amplifies weak signals to a greater degree than strong signals, so that the output of the tube is fairly constant for a wide variation of signal input. For weak signals the tube 325 amplifies the whole wave, with the negative pulse slightly compressed. For moderate and strong signals the tube 325 compresses progressively more of the negative pulses with increasing signal strength. This action of tube 325 on weak, moderate and strong signals is illustrated in diagrams A1, B1 and C1 of Fig. 36.

While the charging time of the grid bias condenser 325c is very short, the rate of discharge is comparatively low due to the high value of resistor 325d. In the present form of our system as herein set forth, the charging time of condenser 325c is less than the duration of a phasing pulse sent out by the transmitter, and the discharging time endures for at least one revolution of the transmitter drum 21 (that is, for one scanning line). For this purpose we use a condenser of large capacity (say, 0.1 mfd.) and make the resistor 325d of high value (say, 10 megohms). We mention these figures merely by way of example.

With the charging time of condenser 325c less than the duration of a phasing pulse, it is certain that the condenser charge will always reach full value during a phasing pulse at any signal level. In this case it is necessary to make the discharging time of condenser 325c cover at least one turn of the transmitter drum 21 for the following reason: As we have seen, a phasing pulse is sent to the recorder once for each revolution of the transmitter drum 21 for a brief duration of time and this pulse places a negative bias voltage on grid 364 of tube 325. Now, if for the remainder of a scanned line no black marks are encountered by the stylus 69, there is an absence of signals and (without special provisions) the bias voltage on grid 364 would decrease, the amplification of tube 325 would increase, and any noise present would be passed on for recording. To prevent this from happening we make the discharge time of condenser 325c long enough to keep sufficient negative bias on grid 364 for one scanning line, so that the amplification of tube 325 is held down to a point where noise signals will not pass.

The elements 325b, 325c and 325d constitute a grid leak combination which determines the bias on grid 364 of tube 325. Since this tube is of the remote cut-off type, its amplification varies with the effective grid bias, which in turn varies with the strength of the input signals. The time constant of the grid leak combination 325b—325c—325d is such that the bias on grid 364 when once established decreases rather slowly but increases rapidly. As the signal increases, the current flowing to the grid 364 increases correspondingly and thus charges the condenser 325c, so that a negative bias is applied to the grid by the voltage drop across the resistor 325d.

The operating characteristics of tube 325 (as determined by the slope of its transfer characteristic curve) are such that strong or large signals are amplified proportionately less than weak signals. As indicated in diagram B1 and C1 of Fig. 36, the positive peaks of increasing signals are compressed by the resistor 325b which acts as a limiter to dissipate excess voltage and thereby prevent severe noises from varying the signal output of tube 325. The resistor 325b performs the additional function of slowing down the charging time of condenser 325c. This prevents sudden strong bursts of local static from interfering with the passage of normal signals which will record as soon as the D. C. bias applied momentarily to condenser 325c by the static burst has drained off.

It is a characteristic of tube 325 that it operates with a signal rejection rate which increases with increase of signal. This is indicated in diagrams B1 and C1 of Fig. 36 by the horizontal lines $x$ and $x'$ which represent each the time interval between the beginning of a cycle and the instant when plate current flows through the tube. For all but the weaker signals, tube 325 rejects the incoming wave until the signal voltage rises to a point where the plate draws current. That is to say, the tube 325 rejects any signal voltage lower than the grid bias voltage and the interval during which the signal voltage rises to the level of the bias voltage is represented by the lines $x$ and $x'$ in the wave diagrams. For the purposes of description we may regard the lengths of lines $x$ and $x'$ which increase with rise in signal level, as denoting roughly the signal rejection characteristics of tube 325.

The output of tube 325 is passed to the second tube 326, which operates as a limiter for all but the weakest signals which are slightly amplified. The tube 326 operates with a low negative bias (say, minus 0.5 volt) and with very low plate and screen voltages. The plate voltage (6 to 8 volts positive) is determined by the value of resistor 326e and the screen voltage is determined by the voltage divider consisting of resistors 326f and 326g, these figures being given merely as practical examples. The signals coming from tube 325 charge the condenser 326c which applies a negative bias to the control grid 326a across a resistor 326b. The condenser 326c is connected in series with a resistor 326d to form a grid limiting circuit which has a much more rapid time constant than the grid leak circuit of tube 325. Consequently the tube 326 passes on the more positive portion of the signal wave while rejecting the negative portion. As the signals entering tube 326 increase in level, they are increasingly more limited because of the value of resistor 326b and the characteristics of the tube. The effect of tube 326 on weak, moderate and strong signals is illustrated in diagrams A2, B2 and C2 of Fig. 36.

The characteristics of tube 326 include the function of decreasing the signal rejection rate with increasing signal level. This, it will be noted, is the reverse of the rejection characteristic of tube 325. That is to say, while tube 325 has a rejection rate which increases with increasing signal level, the second tube 326 operates with a rejection rate which decreases with increase of signal. The result of this automatic compensation feature is a more nearly constant ratio of signal passed to signal rejected.

The output of tube 326 goes into the third tube 327, which is of the sharp cut-off type and operates with a fixed cut-off bias which is adjustable to the proper value by a potentiometer 365 to remove the residual noise from the input signals. The potentiometer 365 is regulated by the fingerpiece 320 on the control panel 312 (Fig. 26). A condenser 327c and resistor 327d form a conventional interstage coupling for the grid 327a, but the time constant of 327c—327d is very short as compared with that of 325b—325c—325d.

The tube 327, which operates beyond cut-off, passes only those signals that are above the minimum voltage determined by the grid bias setting of potentiometer 365. This will be understood from diagram A3 of Fig. 36, where the input wave coming from tube 326 is indicated by $a2$ and the fixed negative bias of tube 327 is denoted by the line $b2$. The tube 327 does not start to conduct until the wave $a2$ reaches the bias level $b2$ after an interval measured by the line $x$, the meaning of which was previously explained in connection with tube 325. In other words, the third tube 327 passes only those portions of the signal wave which are positive beyond the fixed negative bias on grid 327a and those passed-on portions of the signal wave are positive pulses of approximately rectangular wave shape. The negative pulses of the signal waves, it will be recalled, are eliminated in tubes 325 and 326. Therefore, what we are passing through the third tube 327 are positive signal pulses of approximately rectangular shape, free of all deleterious noise and substantially uniform, as indicated in the wave diagrams A3, B3 and C3 of Fig. 36.

The fourth tube 328 is a double triode used as a grid-limiting over-driven amplifier to limit the higher signals passed by the third tube 327 in excess of the minimum signals. The tube 328 receives the rectangular signal impulses from tube 327 through a differentiating network composed of a condenser 328c and a resistor 328d, which changes the rectangular positive wave into sharp positive and negative pulses by the charging and discharging of the condenser. This will be understood by electrical engineers without further explanation and we need only refer to diagrams A4, B4 and C4 of Fig. 37 as illustrating the approximate shape of the differentiated wave before passing into the tube 328. The condenser charge flows to the grid 328a through a resistor 328b which limits the peaks of these positive and negative pulses so that they are shaped into a more uniform A. C. wave. The output of the left side of tube 328 is indicated by the diagrams A5, B5 and C5, and the output of the right side of tube 328 (that is, the final output of this tube) is indicated by the diagrams A6, B6 and C6.

Comparing the widely varying signal input of the first tube 325 with the output of the fourth tube 328 (diagrams A6—B6—C6) we see the efficient operation of the amplifier in converting transmitted signals, fluctuating over a wide range, into recording signals of relatively uniform energy content. The final output of limiter tube 328 passes through a voltage divider network which contains a gain control 366 and a record level control 367 for the final tube 329. The gain control 366 is a potentiometer adjusted at the factory by means of the dial 331 mounted on the base of the receiver (see Fig. 26). The record level control 367 is a potentiometer regulated by the fingerpiece 321 on the control panel 312 to effect a vernier adjustment of the gain required by any particular machine.

The final tube 329 of our recording amplifier is a conventional beam-power tube which amplifies the received signals to the required strength. The output of tube 329 is a fairly constant A. C. voltage which goes into the primary coil 368 of transformer 330. The recording voltage induced in the secondary coil 369 of this transformer is impressed on the stylus 245 which produces marks on the electrosensitive paper 210 in a manner well understood by facsimile engineers.

It will be apparent from the foregoing description that our facsimile recording amplifier differs materially in construction and operation from prior amplifiers used in radio receiver circuits for automatic volume control. As is well known, in radio receivers it is necessary to maintain distortion at a minimum and that limits the range of satisfactory operation of the receiver. Furthermore the output of radio receivers actually increases with an increase of input signal, although the rate of such increase is somewhat cut down by automatic volume control.

In our novel recording amplifier we are concerned only with black and white signals (that is, with signal and no-signal), intermediate tones not being important. Therefore our amplifier had to be designed in such a way as to maintain the energy content of the output recording signals relatively constant over a wide range in input level. In other words, distortion of the signal wave shape in our equipment is unimportant as long as the black marks are recorded with approximately constant density for weak and strong signals. To cite specific figures by way of illustration, the particular form of recording amplifier herein disclosed was designed to operate with a signal input variation of 45 decibels and the values of the condensers and resistors used in the tube circuits were so chosen that a change of at least 40 decibels in the input level will produce a change in the recording level of less than 2 decibels. Such a small reduction of voltage on the recording stylus will not appreciably lessen the black density of the recorded mark. As a result, weak signals passing through our amplifier are recorded with practically the same density as strong signals.

The time constants of the interstage couplings containing the condensers 326c, 327c and 328c have large values so that the low frequency components of signals pass readily through the amplifier, which operates on frequencies of wide audio range (for example, between 1000 and 4000 cycles per second). With respect to the noise removing function of our amplifier, the circuits are so designed that noise of less than half a signal amplitude will not appreciably detract from the recorded copy.

In describing the operation of our recording amplifier we have referred to signals of different strengths or levels as weak, moderate and strong. We realize that these terms are merely relative and it would be impossible to give any set of accurate figures applicable to every embodiment of our invention. However, we can give a fairly good idea of what we regard as weak, moderate and strong signals by considering what we actually did in the particular apparatus we are describing as illustrative of our invention. We so designed our recording amplifier that the minimum input voltage on which it will operate satisfactorily is of the order of 0.2 volt, and we assumed that the maximum signal voltage received would be about 40 volts. Weak signals may be said to be those of such low voltage (in this case, up to 0.5 volt) that the first tube 325 passes both the positive and negative pulses, although a portion of the negative pulses may be compressed. Those signals in which the tube 325 clips off a portion of the positive peak and eliminates a part of the negative pulse, we refer to as moderate signals which vary, let us say, between 0.5 and 5.0 volts. Signals of higher voltage may be designated as strong or large signals for the purposes of this specification. It goes without saying that the above figures are put forth merely as examples and do not imply any restriction on the scope of our invention. As for the wave diagrams of Figs. 36 and 37, it will be understood that these are not of mathematical accuracy and were drawn as rough approximations of changes in the signal waves as they pass from one tube to the next in the recording amplifier.

*The phasing operation*

In describing the operation of the recording amplifier we assumed that the recording stylus 245 was running in phase with the scanning stylus 60 of the transmitter. We shall now explain how the transmitting and recording mechanisms of the two machines are automatically started in phase and maintained in that relationship until the entire message has been scanned and recorded.

The output line 370 of the limiter tube 328 is connected to a conductor 371 which goes through a condenser 371' into the control grid 372 of tube 332 in the phasing amplifier 323. This tube is a pentode with a sharp cut-off and with a grid bias control 373 which is a potentiometer set to the proper value at the factory by means of disk 334 (Fig. 26) as previously mentioned. It should be noted that the recording amplifier is tapped by the input phasing conductor 371 at a point where the A. C. signal voltage is constant, reduced to the desired level, and divested of noise frequencies.

The output of tube 332 in the phasing amplifier goes to the grid 374 of tube 333 which is a thyratron of well known construction and operation. The cathode 375 of tube 333 is connected to the output lead 376 which goes to the contact 377 of phasing switch 315 on control panel 312. The other contact 378 of switch 315 goes to conductor 358 which (let us remember) is always at a positive D. C. potential of 250 volts. The plate circuits of both tubes 332 and 333 are connected to conductor 358 by a wire 379 with a resistor 380 in the plate circuit of tube 332. A condenser 381 is connected between the plate of tube 332 and the ground wire 382. A condenser 383 is inserted in the connection 384 between the plate of tube 332 and the grid of tube 333.

Turning back for a moment to the phasing operation of the transmitter, as depicted diagrammatically in Figs. 17 to 21, we saw that a phasing signal of maximum voltage is sent to the radio transmitter 165 during the interval in which the phasing contact 87 crosses the commutator segment 83. This phasing signal is superimposed on the output of radio oscillator 168 and is picked up by the radio receiver 363, which is supposed to have been tuned to the carrier wave of the radio transmitter. It should also be remembered that the phasing signal is transmitted once for each revolution of the transmitter drum.

When the phasing signal enters the recording amplifier, it goes to the control grid 364 of the first tube 325. In passing through the amplifier the signal is freed of noise and is limited to the proper value, so that the operation of the phasing circuit is independent of noise frequencies and variations of signal level within the operating range of the system. When the phasing signal is tapped off the output of limiter tube 328 by conductor 371, it is impressed on the control grid 372 of tube 332.

In the absence of a phasing signal, the control grid 372 is connected to ground through a resistor 385 so that the tube 332 is not passing current and acts like an open circuit. Under those conditions the condensers 381 and 383 are charged to practically the full voltage (say 250 volts) of line 358 which is connected to the D. C. terminal 352 of the power unit 341. The potentiometer 373 is so set by the dial 334 on control panel 312 that the tube 332 is normally biased beyond cut-off. This tube will operate only when positive voltage is applied to its screen grid 386 and that happens only when a relay 387 is energized to close a contact 388 in the screen grid circuit. The relay 387 is energized from the power source A—B only when the pin 283 on the clutch wheel 260 closes the switch 285 during the phasing moment of the machine.

Referring to the gaseous tube 333 in the phasing amplifier, its cathode 375 is connected to the junction point 389 of resistors 390 and 391, which are connected between the line 379 and the grounded wire 382. The output lead 376 of the phasing amplifier goes from the junction point 389 through a condenser 392 to switch contact 377. The grid 374 of tube 333 is connected to the grounded wire 382 through a resistor 393 and is biased negatively with respect to cathode 375 by the voltage divider 390—391. Consequently, this tube will fire only when a higher positive voltage is applied to the grid.

Assuming that the synchronous stylus motor 250 is running and that the drive wheel 260 is held locked by the armature 276 of magnet 280 (Fig. 27) let us see what happens in the tubes 332 and 333 when a phasing signal is impressed on the control grid 372 of tube 332. The relay 387 being energized by the closing of switch 285, a positive voltage is applied to screen grid 386 just prior to the phasing pulse so that the tube 332 is placed in a standby condition. Therefore, when the phasing pulse is received by grid 372, the tube 332 draws current and a voltage drop occurs across the resistor 380. In consequence the previous high voltage charge in condensers 381 and 383 is considerably reduced, so that a voltage negative with respect to the cathode 375 is applied to grid 374 of tube 333 which thus remains inactive for the duration of the phasing pulse.

Now, when the phasing signal is removed from grid 372 (which happens when the phasing contact 87 moves off the segment 83 in Fig. 18), the tube 332 stops drawing current and plate voltage rises instantly. The condenser 381 charges to +250 volts through resistor 380 and condenser 383 charges similarly through resistors 380 and 393. This results in a high positive surge across resistor 393 to grid 374 of tube 333, which thereby triggers and discharges a high plate current to cathode 375. This momentary current produces a high voltage surge across resistor 390 and through condenser 392 to the phasing magnet 280.

The operation of magnet 280 moves the armature 276 away from stop 275 to release the clutch wheel 260 (Fig. 27) which pulls the stylus carriage 225 from its initial position straight across the paper for one scanning line. As soon as the stop 275 is moved past the armature 276, the magnet 280 is deenergized and its armature drops back into the path of tooth 275, which engages the armature at the end of each scanning line to stop the stylus carriage and permit its return to initial position for the next scanning line.

The reason why the phasing magnet 280 is energized only for a moment upon the cessation of the phasing pulse is due to the following conditions: When the tube 333 fires, as above explained, the resistor 391 is short-circuited by the tube, so that the voltage on cathode 375 increases almost to the D. C. voltage of line 358. As a result the voltage on grid 374 becomes negative with respect to the cathode voltage. Since current will flow in tube 333 only as long as the grid is more positive than the cathode (which is only for a short interval at each phasing operation), the tube ceases to conduct after the passage of the current surge therethrough and the phasing magnet 280 releases.

We have previously explained that the starting motor 354 for the stylus motor 250 is energized upon operation of magnet 296 which closes the switch 300. One side of this magnet is connected to lead 394 of the power supply terminal 351 and the other side of the magnet goes by wire 394' to one contact of a normally open switch 395. The other contact of this switch is grounded at 396. When the start button 314 is operated, the switch 395 is closed to energize the magnet 296 which in turn closes the circuit of starting motor 354 from the secondary coil 347 of transformer 342 through conductors 355—356, switch 300, and a switch 398 closed by the start button. It will be noticed that the switches 300 and 398 are in series in the circuit of starting motor 354. This added safety feature causes the manual release of start button 314 to deenergize the starting motor instantly, even if the magnet switch 300 should be slow to open due to a delayed release of armature 301.

Before pressing the start button 314 the operator makes sure that the toggle switch 315 is in forward position (as shown at 315' in Fig. 26) to close the contact 378 (Fig. 35). This connects the magnet 280 to the D. C. power terminal 352 and keeps it energized to hold the armature 376 out of the path of tooth 275, so that the wheel 260 is free to turn. This removes the load of the friction clutch 261—262 (Fig. 29) from the synchronous motor 250. Consequently, when the start button 314 is operated, the stylus motor 250 (for the moment in load-free condition) is quickly brought up to a speed slightly above synchronism.

The start button 314 also controls a normally closed switch 399, one contact of which is grounded at 396 and the other contact goes by wire 400 to the cathodes of the two beam-power tubes 336 and 337 in the motor amplifier 324. With the switch 399 opened by the operation of start button 314, ground is removed from the cathodes of tubes 336—337, which are thus rendered inoperative and take the synchronous power supply from motor 250, which is thereby allowed to come up to speed more easily by the starting motor 354.

When the button 314 is released, the starting motor 354 is disconnected by the opening of switch 398, and the closing of switch 399 restores ground to the cathodes of tubes 336—337, which now operate in push-pull arrangement to energize the output transformer 338. As a result, the stylus motor 250 instantly coasts down to synchronous speed at which it is maintained by an oscillator unit 401, now to be described.

The oscillator 401 is a standard device obtainable in the market and well known to electrical engineers, so we have indicated in Fig. 35 only such parts of the oscillator as are required for this description. It will be recalled that the control panel 312 (Fig. 26) has a finger piece 316 adapted to occupy either of two positions 316a and 316b. The meaning of those two positions will be clear from the oscillator diagram in Fig. 35 where the switch 316 controls an inductance coil 402. In position 316a the switch includes all of inductance 402 in circuit, while in position 316b of the switch only a part of the inductance is included.

The frequency of the oscillator 401 is determined by the inductance 402 and two condensers 403 and 404. The condenser 403 is variable by means of knob 317 on the control panel 312 to permit adjustment of the oscillator frequency. For this description we may assume that in switch position 316a the oscillator frequency band is 715–810 cycles per second for synchronous operation of the recorder, and in position 316b the frequency band is 840–950 cycles for start-stop operation.

A conductor 405 connected to lead 357 supplies D. C. plate voltage to a tube 406 which sets up sustained oscillations in the circuit comprised by the parts 402—403—404, as will be clear to electrical experts without detailed description. The output lead 407 of the oscillator goes to the plate 408 of the twin triode 335 in the synchronous power amplifier 324, already described. The tube 335 amplifies the oscillator frequency and supplies voltage to drive the tubes 336 and 337 through connections well understood in devices of this kind. The output transformer 338 is approximately tuned for the frequency band used by means of a condenser 409.

In summary, then, we can say that the frequency output of oscillator 401 is amplified to the required level by the amplifier 324 to operate the stylus motor 250 at a predetermined synchronous speed for either kind of phasing operation.

It will be remembered that the relay 387 is energized when the switch 285 is closed by the pin 283 on the drive wheel 260. The operation of this relay automatically performs several functions. We have already mentioned that the closing of contact 388 puts D. C. voltage on the screen grid 386 of tube 332. The relay 387 also operates a contact 410 and a make-and-break assembly comprising a tongue 411, a pivoted arm 412 and a fixed contact 413 to which the recording stylus 245 is connected. The pivoted arm 412 is connected to one side of the output coil 369 of the recording amplifier and normally engages the contact 413 to close the stylus circuit. When the relay 387 is energized, the armature tongue 411 throws the arm 412 to open position.

The normally open contact 410 is connected at one side to solenoid 203 of the paper feed motor 197 and the other side of that contact goes to the junction point 414 of a network comprising a condenser 415 and two resistors 416 and 417. The conductor 394 which is connected to the D. C. terminal 351 goes to the junction point 418 between the resistors 416 and 417, whereby the condenser 415 is charged from the high voltage supply through resistor 416 which cuts down the current in magnet 203.

When the contact 410 is closed upon the energization of relay 387, the highly charged condenser 415 discharges with a surge of current through the magnet 203, which gives the ratchet wheel 206 a kick and thereby steps the paper ahead one line. This happens during the return of stylus carriage 225, as will presently be explained. The bleeder resistor 417 limits the peak no-load voltage from the power supply.

The relay 387 is not energized during a recording operation, so that the contacts 412—413 hold the stylus circuit closed to record the incoming facsimile signals on the electrosensitive sheet 210. Facsimile recording by means of an electric stylus is so well known that an explanation of it would be superfluous. When the relay 387 is energized during a phasing operation, the tongue 411 engages the contact arm 412 before it moves the latter to open position. Consequently, the output of the recording amplifier is transferred from the stylus 245 to a grounded resistor 419. The reason for thus interrupting the stylus circuit when the relay 387 is energized will be clear from the following description of the receiver operation in the phasing and recording functions.

*Operation of the recorder*

We are to suppose that the attendant is listening with a pair of earphones plugged into the radio receiver 363 for a prearranged code signal from the transmitter to start his machine. We shall further assume that the recorder has already been adjusted as to power level, noise rejection, etc., and is in condition for facsimile reception. On hearing the start signal the attendant first closes the power switch 313 to energize the power unit 341. This puts heating current on the filaments and high D. C. voltage on the plates of the tubes in the recording system, which is thereby placed in stand-by condition.

With the oscillator switch 316 in position 316b for start-stop phasing, the attendant throws the toggle switch 315 forward on contact 378 to energize the phasing magnet 280. This releases the drive wheel 260 and takes the clutch load off the stylus motor 250. The next thing the attendant does is to press the start button 314 and hold it down briefly, whereby the starting motor 354 is energized and the synchronous power is taken off the stylus motor 250 by the removal of ground from the cathodes of tubes 336—337. Consequently, the load-free motor 250 is driven above synchronous speed. It does not matter that the stylus carriage 225 is drawn at this time across the paper; for there is no voltage in the stylus and no recording takes place.

When the motor 250 speeds up (it takes but a couple of seconds) the attendant releases the start button 314, whereby the starting motor 354 is disconnected and the motor 250 automatically coasts down to the synchronous speed fixed by the frequency output of oscillator 401. That frequency, it will be recalled, is accurately determined by the combined adjustment of switch 316 and condenser knob 317 on the control panel 312.

It may be stated here that the start-stop phasing method is always used unless static is so excessive or operating conditions are so poor that severe fading of the phasing signals makes it necessary to resort to synchronous phasing. In that event, the attendant turns the oscillator switch 316 to position 316a and leaves the toggle switch 315 on contact 378 to cut out the phasing amplifier 323. We shall proceed on the assumption that the receiver is set for start-stop phasing for which it was primarily designed.

With the stylus motor 250 running at synchronous speed upon release of the start button 314, the attendant now throws the toggle switch 315 on contact 377. This releases the phasing magnet 280 and subjects it to the control of the phasing amplifier 323. Upon release of magnet 280 the stop arm 276 moves into the path of tooth 275 on clutch wheel 260, which is now held against rotation and the stylus carriage 225 remains in its initial position, as shown in Figs. 26 and 27. The receiver is now waiting for the phasing pulse from the transmitter. When that pulse is received, the phasing amplifier is conditioned for action and upon cessation of the pulse the magnet 280 is energized to release the wheel 260. The stylus 245 is now pulled across the paper and records the facsimile signals that come over.

Let us bear in mind that the stylus drive wheel 260 is stopped once per revolution after moving the stylus one scanning line across the paper. At the stopping point of wheel 260 the stylus is released and is pulled back by the spring 290 to start position (Fig. 26). At the same time the switch 285 is closed and energizes the relay 387 which puts screen voltage on tube 332 of the phasing amplifier, opens the stylus circuit and energizes the magnet 203 to feed the paper 210 ahead for the next scanning line. The switch 285 remains closed until the phasing magnet 280 is energized. The receiver is now ready for the next phasing signal which comes from the transmitter once per revolution of the scanning drum 21 and commutator 77, as we have seen.

To make sure that the phasing pulse will always be received when the recording stylus 245 is in start position for the next line, this stylus operates at a linear scanning speed slightly faster than that of the transmitting drum 21 with respect to stylus 60. This difference in speed enables the recording stylus to get through first—that is, to reach the end of a line before the transmitting drum completes its scanning revolution for that line of recording. Therefore, the recording stylus 245 is yanked back to start position for the next line and waits there for a very brief interval for the next phasing signal.

By the time the stylus 245 has reached the new start position, the magnet 203 has stepped the paper ahead one line. It should be noted that during the return of the stylus carriage 225 and while the stylus is at rest at the beginning of a new scanning line, the stylus circuit is held open by the energized relay 387.

It is to be observed that the phasing amplifier 323 is not operated by facsimile signals, although these also pass through the tap line 371 to the grid 372 of tube 332. The reason why facsimile signals have no effect on the phasing amplifier is due to the fact that the relay 387 is not energized during a recording operation, so that the circuit of screen grid 387 of tube 332 remains open and the tube stays inoperative. Only at the end of each scanning line is the relay 387 energized to place the phasing amplifier 323 in condition to be operated by the next phasing signal when the stylus carriage 225 is at the beginning of the next scanning line.

We have, then, a facsimile recorder constructed to operate with slow scanning strokes and quick return strokes of a reciprocating stylus and designed to phase at the beginning of each line of copy. The slow variations in transmitter and recorder speed are thus corrected for each line, so that progressive drifts do not show up in the facsimile copy. If the receiver attendant should find during a transmission under synchronous operation that he is getting copy with weaving lines, he simply turns the condenser knob 317 on control panel 312 to adjust the frequency of oscillator 401 until the signals are recorded in a straight line.

For synchronous phasing, which is used only when atmospheric conditions make start-stop phasing unreliable, the attendant turns the oscillator switch 316 to position 316a and throws the toggle switch 315 on contact 378. The switch position 316a decreases the oscillator frequency to lower the speed of motor 250 and the forward position of switch 315 keeps the phasing magnet 280 energized. As a result of this setup, the clutch wheel 260 is driven continuously and the recording stylus 245 operates in phase with the transmitter scanning mechanism without any stop period at the beginning of each line. Thus, by having novel phasing apparatus adapted to be instantaneously adjusted for synchronous or start-stop operation, our receiver is capable of recording good copy even under severe conditions of operation.

As will be understood from the appended claims, certain features of our invention belong to the sending end of our system and other features pertain to the receiving end, but this does not mean that all novel features must be embodied in the same system. On the contrary, in the broader aspects of our invention, some features can be used without others to secure the practical advantages inherent therein. Regarding the transmitter end of our system we do not herein claim broadly the idea of scanning graphite pencil marks on electrically conducting paper with an electric stylus.

While we have shown and described certain specific apparatus and circuit connections, our invention is not to be regarded as restricted to the details set forth, for the novel features of our facsimile machines and system are capable of various other embodiments within the scope of the claims that follow.

We claim as our invention:

1. A facsimile system comprising a transmitter and a recorder adapted to be operatively connected, said transmitter having a rotary scanning drum and an electric stylus for scanning a message sheet on said drum, a keying tube at the transmitter, a commutator operated synchronously with said drum, said commutator comprising an insulated metal ring provided with an insulated metal segment which is grounded, a pair of spaced brushes arranged to engage said ring and segment, one of said brushes being connected to the stylus and the other brush being connected to the control grid of said keying tube, means for sending a phasing signal of definite duration through said tube when the first brush is on the insulated ring and the other brush is on the grounded segment, circuit connections including said control grid and commutator ring for causing said tube to pass facsimile signals only when the stylus scans a mark on the message sheet, and apparatus at the recorder automatically energized in response to the cessation of a received phasing signal to place the recorder in operative condition for recording the facsimile signals.

2. A facsimile system comprising a transmitter and a recorder adapted to be operatively connected, said transmitter having a rotary scanning drum and an electric stylus for scanning a sheet on the drum, said sheet having a rectangle thereon which defines the available intelligence area of the sheet, the end portions of the supported sheet overlapping to provide an unmarked space outside the intelligence area, a commutator assembly at the transmitter operable synchronously with said drum, a keying tube at the transmitter having a control grid connected to said stylus through said commutator assembly when the stylus passes over said intelligence area, said commutator assembly including contact means for automatically grounding said grid when the stylus passes over said unmarked space, the grounding of said grid causing said tube to send out a phasing signal of definite duration, connections whereby said commutator assembly causes said control grid to be grounded when the stylus scans a mark on the sheet, whereby said keying tube passes a high current and sends out facsimile signals, and apparatus at the recorder automatically energized in response to the cessation of a received phasing signal to place the recorder in operative condition for recording the facsimile signals that pass through said tube.

3. A facsimile system comprising a transmitter and a recorder adapted to be operatively connected, said transmitter having a rotary scanning drum and an electric stylus for scanning a sheet on the drum, said sheet having a rectangle thereon which defines the available intelligence area of the sheet, the end portions of the supported sheet overlapping to provide an unmarked space outside the intelligence area, a commutator rotatable synchronously with said drum and having an insulated grounded segment, a pair of spaced brushes mounted to engage said commutator, a keying tube at the transmitter having a control grid connected to one of said brushes, whereby said grid is grounded each revolution of the drum when said one brush engages said grounded segment, the other brush being connected to the stylus, circuit connections whereby said tube passes current and sends out a phasing signal of definite duration when the grid is grounded, the angular relationship between the stylus and the brushes being such that said phasing signal is sent out when the stylus passes over said unmarked space, means for grounding said control grid when the stylus scans a mark in the intelligence area of the sheet, whereby said keying tube passes a high current and sends out facsimile signals, and apparatus at the recorder automatically energized in response to the cessation of a received phasing signal to place the recorder in operative condition for recording the facsimile signals that pass through said tube.

4. A facsimile system comprising a transmitter and a recorder adapted to be operatively connected, said transmitter having an electric stylus to scan an electrically conductive sheet bearing marked and unmarked areas of low and high resistance respectively, an amplifying network at the transmitter provided with a keying tube whose grid is normally so biased as to cut off the tube, phasing means at the transmitter adapted to ground said grid periodically for a definite interval, whereby a high current passes through said tube to send out a phasing signal of certain duration, circuit connections responsive to the scanning of a mark for grounding said grid and thereby causing a signal current to flow through said tube, an amplifier at the recorder having an input tube and a control grid which receives the phasing pulses as well as the scanning signals passed by said transmitter keying tube, and apparatus at the recorder automatically energized in response to the cessation of a received phasing pulse to place the recorder in operative condition for recording the scanning signals that pass through the output circuit of said amplifier.

5. A facsimile system comprising a transmitter and a recorder adapted to be operatively connected, said transmitter having electric scanning mechanism in which a stylus operates on electrically conductive paper having marked and unmarked areas which offer, respectively, low and high resistances from stylus to ground, an amplifying network including a keying tube, means for connecting the stylus to the control grid of said tube during a scanning operation, a source of voltage supply for said tube, the plate circuit of said tube constituting the amplified signal output of the network, means for impressing a negative bias on the control grid of such value that the tube will not pass a signal current when the stylus is on an unmarked area of high resistance, said grid biasing means including a resistor which causes the control grid to be practically grounded when the stylus scans a mark, contact means for periodically grounding said grid for a definite interval independently of the stylus, circuit connections whereby the grounding of the grid by said contact means causes the tube to pass a phasing signal of certain duration to said output and the grounding of the grid by a scanned mark causes the tube to pass a scanning signal, a condenser at the recorder so connected in the system as to be charged by said phasing and scanning signals, a phasing circuit at the recorder energized in response to the charging of said condenser by a phasing signal, and a recording circuit energized in response to the charging of said condenser by a scanning signal.

6. A facsimile system comprising a transmitter and a recorder adapted to be operatively connected, said transmitter having scanning mechanism which includes a rotary drum for supporting copy to be scanned, means in the transmitter for generating a phasing pulse of definite duration at each revolution of the drum, an amplifier in said recorder having an input circuit which contains a condenser adapted to be charged by phasing pulses, means whereby said condenser is fully charged in less time than the duration of a phasing pulse and is discharged for the period of at least one revolution of said drum, and means whereby said slow discharging time of the condenser prevents the passage of noise signals through said amplifier.

7. A facsimile system comprising a facsimile transmitter provided with scanning mechanism which includes a rotary drum for supporting copy to be scanned, means for generating a phasing pulse at each revolution of said drum, in combination with a facsimile recorder having a vacuum tube amplifier for receiving the scanning signals and said phasing pulses, and circuit connections whereby each phasing pulse and scanning signal received by said amplifier imposes a negative bias on the control grid of the input tube of said amplifier in accordance with the received wave level, said connections including a condenser-resistor circuit with a time constant sufficient to maintain the negative grid bias due to a phasing pulse for one revolution of said drum, said negative bias holding the amplification of the input tube down to a point where no background of noise signals will pass even when no mark on said copy is scanned for a whole turn of the drum.

8. A facsimile system comprising a transmitter provided with scanning mechanism which includes a rotary drum for supporting copy to be scanned, means for generating a phasing pulse of definite duration at each revolution of said drum, a recorder having a vacuum tube amplifier with an input tube for receiving the scanning signals and said phasing pulses, connections whereby each phasing and scanning signal received by said amplifier imposes a negative bias on the control grid of said input tube in accordance with the received wave level, said connections including a condenser-resistor circuit of such values that the charging time of the condenser is less than the duration of a phasing pulse and the discharging time covers substantially one revolution of the transmitter scanning drum, a recording circuit connected to the output tube of said amplifier, a phasing circuit connected to said amplifier at a point between the input and output tubes, and automatic means whereby the phasing pulses are prevented from affecting the recording circuit and the scanning signals are kept out of the phasing circuit.

9. A facsimile system comprising a transmitter and a recorder adapted to be operatively connected, an electric stylus in said transmitter for scanning a message sheet mounted on a rotary drum, a synchronous motor for operating said drum from a local power supply, means for sending out a phasing pulse of certain duration at each turn of the drum, an electric stylus in said recorder mounted for reciprocating movement across a recording blank, a synchronous motor energized from a local source of power for operating said recording stylus, an adjustable oscillator at the receiver for regulating the speed of said recording motor so that the recording stylus reaches the end of a line before the transmitter drum completes its revolution for that line of recording, and apparatus in said recorder controlled by a received phasing pulse for causing the recording stylus to start each scanning line at the same moment as the transmitting stylus, so that slight variations in the relative speeds of said motors during the scanning of a line are compensated for at the start of each line, said apparatus including a relay energized during a phasing pulse to hold the circuit of the recording stylus open while said stylus is at rest at the beginning of a new recording line.

10. A facsimile system having a transmitter and a recorder adapted to be operatively connected, a rotary scanning drum at the transmitter, means operable synchronously with said drum for sending out a phasing pulse at each revolution of the drum, a stylus at the recorder mounted for reciprocating movement across a blank, apparatus at the recorder controlled by said phasing pulse for causing start-stop operation of the recording stylus, said apparatus including a device for determining the linear recording speed of said stylus, and means for adjusting said device to operate the recording stylus in synchronism with the scanning drum independently of said phasing pulses.

11. In a facsimile system having a transmitter and a recorder adapted to be operatively connected, means in the transmitter for sending out a phasing pulse of definite duration prior to the message scanning of each line for causing start-stop operation of the recorder, line scanning mechanism in the recorder, a motor for driving said scanning mechanism, means for stopping said scanning mechanism at the end of the message scanning of each line, a phasing amplifier in the recorder having an input tube and an output tube, means including said motor for periodically placing said input tube in operative condition at the end of the message scanning of each line and prior to the arrival of a phasing pulse, means to apply the phasing pulse to the input tube to effect energization thereof when said input tube is in operative condition, means for energizing said output tube in response to and at the instant of the cessation of each of said pulses, and start mechanism for said scanning mechanism energized by the operation of said output tube.

12. In a facsimile system having a transmitter and a recorder adapted to be operatively connected, a scanning drum at the transmitter rotatable at synchronous speed, means for sending out a phasing pulse of definite duration at each rotation of the drum, a stylus in the recorder mounted to reciprocate across a blank for line-by-line recording, start-stop phasing apparatus at the recorder controlled by said timed phasing pulses after each line of recording to start said stylus for the next line in synchronism with said scanning drum, and manually operable switch means at the recorder for disconnecting said phasing apparatus to operate the recording stylus synchronously with the transmitter drum independently of said phasing pulses.

13. In a facsimile system having a transmitter and a recorder adapted to be operatively connected, a synchronously driven commutator at the transmitter, said commutator having a phasing segment of prescribed length, contact means for said commutator, circuit connections including said contact means for generating a phasing pulse for each revolution of the commutator, the duration of said pulse being determined by the length of said phasing segment, a stylus at the recorder mounted to reciprocate across a blank for line-by-line recording, driving means for said stylus, start-stop phasing apparatus at the recorder controlled by said phasing pulses, and means whereby said apparatus starts the stylus for each recording line when said contact means leaves the phasing segment.

14. In a facsimile system having a transmitter and a recorder adapted to be operatively connected, scanning mechanism for said transmitter including a synchronously driven drum, an electric stylus in said recorder mounted for reciprocating movement across a sheet for line-by-line recording of the received signals, a synchronous motor at the recorder for operating the recording stylus at a linear speed slightly greater than the scanning speed of said drum, means at the recorder operable automatically at the end of a recorded line for returning the stylus to start position for the next line, start-stop phasing mechanism at the recorder, phasing means at the transmitter so timed as to start sending out a pulse of definite duration when the recording stylus is in start position for the next line, and means whereby said mechanism starts the forward movement of the stylus upon cessation of the phasing pulse.

GARVICE H. RIDINGS.
JOHN H. HACKENBERG.
GEORGE B. WORTHEN.

References Cited in the file of this patent

UNITED STATES PATENTS

| Number | Name | Date |
|---|---|---|
| 1,918,124 | Nicolson | July 11, 1933 |
| 2,062,009 | Mathes | Nov. 24, 1936 |
| 2,230,820 | Young | Feb. 4, 1941 |
| 2,230,822 | Artzt | Feb. 4, 1941 |
| 2,235,550 | Fyler | Mar. 18, 1941 |
| 2,255,408 | Carlisle | Sept. 9, 1941 |
| 2,263,332 | Finch | Nov. 18, 1941 |
| 2,305,842 | Case | Dec. 22, 1942 |
| 2,372,774 | Finch | Mar. 13, 1945 |
| 2,507,145 | Dean | May 9, 1950 |